United States Patent
Zhao et al.

(10) Patent No.: US 10,618,078 B2
(45) Date of Patent: Apr. 14, 2020

(54) BIAS CONTROL FOR CAPACITIVE MICROMACHINED ULTRASONIC TRANSDUCERS

(71) Applicant: Kolo Medical, Ltd., San Jose, CA (US)

(72) Inventors: Danhua Zhao, San Jose, CA (US); Xuefeng Zhuang, San Jose, CA (US); Yongli Huang, San Jose, CA (US)

(73) Assignee: Kolo Medical, Ltd., San Jose, CA (US)

( * ) Notice: Subject to any disclaimer, the term of this patent is extended or adjusted under 35 U.S.C. 154(b) by 458 days.

(21) Appl. No.: 15/212,326

(22) Filed: Jul. 18, 2016

(65) Prior Publication Data

US 2018/0015504 A1   Jan. 18, 2018

(51) Int. Cl.
*H04R 19/00* (2006.01)
*B06B 1/02* (2006.01)

(52) U.S. Cl.
CPC .......... *B06B 1/0292* (2013.01); *B06B 1/0207* (2013.01)

(58) Field of Classification Search
None
See application file for complete search history.

(56) References Cited

U.S. PATENT DOCUMENTS

| | | | | |
|---|---|---|---|---|
| 4,034,332 A * | 7/1977 | Alais | ...................... | B06B 1/0292 367/153 |
| 5,327,895 A * | 7/1994 | Hashimoto | ........... | B06B 1/0629 29/25.35 |
| 5,619,476 A * | 4/1997 | Haller | ................... | B06B 1/0292 367/153 |
| 5,906,580 A * | 5/1999 | Kline-Schoder | ........ | B06B 1/064 310/334 |
| 6,314,057 B1 * | 11/2001 | Solomon | ............... | B06B 1/0292 367/174 |
| 6,625,084 B1 * | 9/2003 | Payton | ................... | H04B 11/00 367/134 |
| 6,775,388 B1 * | 8/2004 | Pompei | ................. | B06B 1/0292 367/181 |
| 6,795,374 B2 | 9/2004 | Barnes et al. | | |
| 7,489,593 B2 * | 2/2009 | Nguyen-Dinh | ....... | B06B 1/0292 367/181 |
| 7,564,172 B1 | 7/2009 | Huang | | |
| 7,612,635 B2 | 11/2009 | Huang | | |
| 7,618,373 B2 * | 11/2009 | Ladabaum | ............ | B06B 1/0292 600/437 |
| 7,759,839 B2 | 7/2010 | Huang | | |
| 7,764,003 B2 | 7/2010 | Huang | | |
| 7,779,696 B2 | 8/2010 | Huang | | |

(Continued)

*Primary Examiner* — Isam A Alsomiri
*Assistant Examiner* — Jonathan D Armstrong
(74) *Attorney, Agent, or Firm* — Mattingly & Malur, PC

(57) ABSTRACT

In some examples, a CMUT may include a plurality of electrodes, and each electrode may include a plurality of sub-electrodes. For instance, a first sub-electrode and a second sub-electrode may be disposed on opposite sides of a third sub-electrode. In some cases, a first bias voltage may be applied to the third sub-electrode and a second bias voltage may be applied to the first and second sub-electrodes while causing at least one of the first sub-electrode, the second sub-electrode, or the third sub-electrode to transmit and/or receive ultrasonic energy. For example, the second bias voltage may be applied at a different voltage amount than the first bias voltage, and/or may be applied at a different timing than the first bias voltage.

29 Claims, 23 Drawing Sheets

(56) References Cited

U.S. PATENT DOCUMENTS

| | | |
|---|---|---|
| 7,880,565 B2 | 2/2011 | Huang |
| 7,956,510 B2 | 6/2011 | Huang |
| 8,004,373 B2 | 8/2011 | Huang |
| 8,008,105 B2 | 8/2011 | Huang |
| 8,018,301 B2 | 9/2011 | Huang |
| 8,105,941 B2 | 1/2012 | Huang |
| 8,120,229 B2 | 2/2012 | Huang |
| 8,247,945 B2 | 8/2012 | Huang |
| 8,345,513 B2 | 1/2013 | Huang |
| 8,363,514 B2 | 1/2013 | Huang |
| 8,384,269 B2* | 2/2013 | Martin ............... H03H 9/02102 310/309 |
| 8,429,808 B2 | 4/2013 | Huang |
| 8,483,014 B2 | 7/2013 | Huang |
| 8,526,271 B2 | 9/2013 | Huang |
| 8,559,274 B2 | 10/2013 | Huang |
| 8,641,628 B2 | 2/2014 | Bradley et al. |
| 8,767,514 B2 | 7/2014 | Huang |
| 8,787,116 B2* | 7/2014 | Petruzzello ........... B06B 1/0292 367/181 |
| 8,791,624 B2* | 7/2014 | Ngo .................. H03H 9/02259 310/334 |
| 8,796,901 B2 | 8/2014 | Huang |
| 8,815,653 B2 | 8/2014 | Huang |
| 8,926,517 B2 | 1/2015 | Huang |
| 8,952,595 B2 | 2/2015 | Huang |
| 8,975,984 B2 | 3/2015 | Huang |
| 9,054,826 B2* | 6/2015 | Lawry ................... H04L 5/0046 |
| 9,132,450 B2 | 9/2015 | Huang |
| 9,221,077 B2 | 12/2015 | Chen et al. |
| 9,408,588 B2 | 8/2016 | Huang |
| 10,330,781 B2* | 6/2019 | Christiansen ......... B06B 1/0215 |
| 10,399,121 B2* | 9/2019 | Zhuang ................. B06B 1/0292 |
| 2003/0048698 A1* | 3/2003 | Barnes ................ G01S 7/52038 367/181 |
| 2005/0007882 A1* | 1/2005 | Bachelor ................. G01S 15/89 367/103 |
| 2005/0200241 A1* | 9/2005 | Degertekin ........... B06B 1/0292 310/334 |
| 2005/0219953 A1* | 10/2005 | Bayram ................ B06B 1/0292 367/178 |
| 2006/0116585 A1* | 6/2006 | Nguyen-Dinh ....... B06B 1/0292 600/459 |
| 2007/0085632 A1* | 4/2007 | Larson, III ............. H03H 9/587 333/187 |
| 2009/0148967 A1* | 6/2009 | Wodnicki ................ H01L 22/14 438/17 |
| 2010/0251823 A1* | 10/2010 | Adachi .................... A61B 8/00 73/606 |
| 2012/0086305 A1* | 4/2012 | Ngo .................. H03H 9/02259 310/300 |
| 2012/0098625 A1* | 4/2012 | Martin ............... H03H 9/02102 333/193 |
| 2013/0064035 A1* | 3/2013 | Kandori ................. B06B 1/0207 367/7 |
| 2014/0117812 A1* | 5/2014 | Hajati ................... B06B 1/0276 310/314 |

* cited by examiner

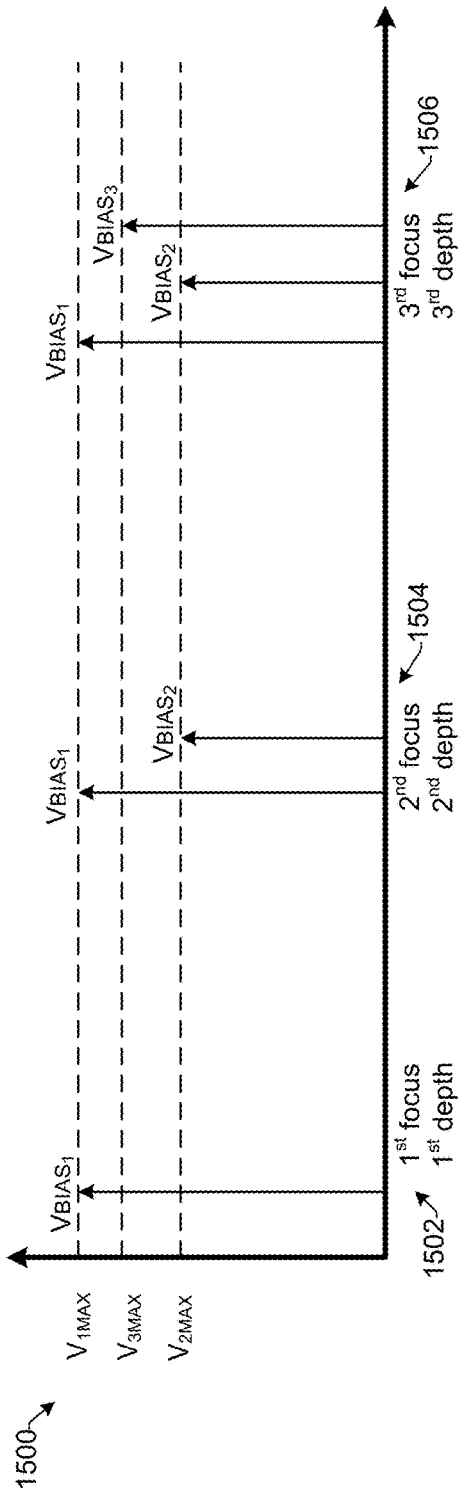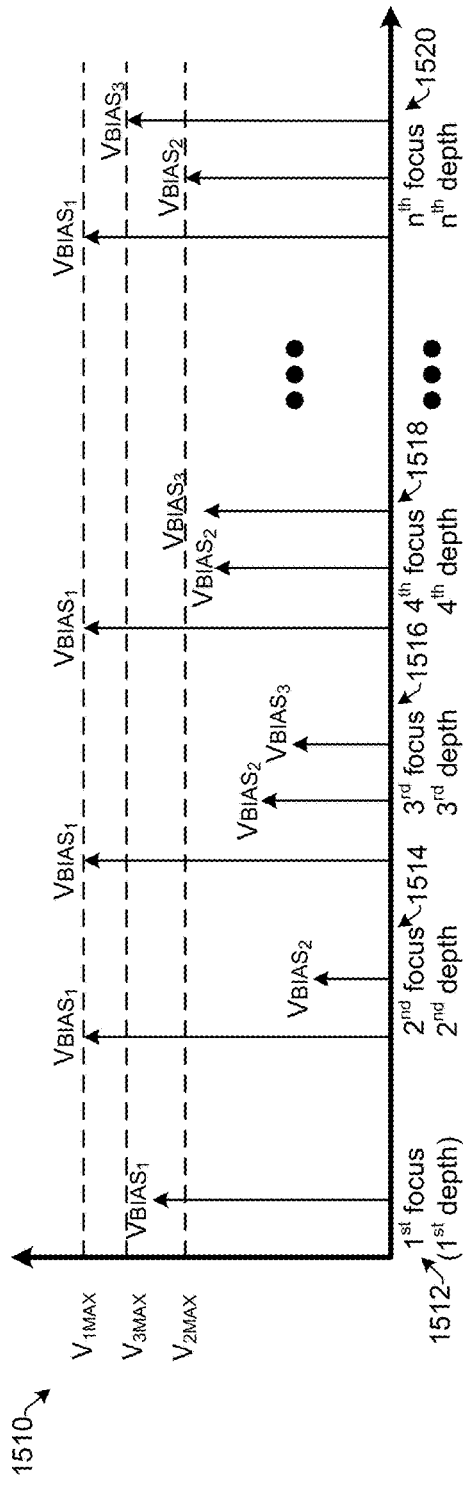

1700

```
┌─────────────────────────────────────────────────────────────────────┐
│ CONFIGURE A CMUT ARRAY WITH A PLURALITY OF ELEMENTS, AT LEAST ONE   │
│ OF THE ELECTRODES OF EACH ELEMENT INCLUDING A CENTER SUB-           │
│ ELECTRODE, A FIRST SUB-ELECTRODE ON A FIRST SIDE OF THE CENTER SUB- │
│ ELECTRODE, A SECOND SUB-ELECTRODE ON A SECOND SIDE OF THE CENTER    │
│ SUB-ELECTRODE, OPPOSITE TO THE FIRST SIDE, A THIRD SUB-ELECTRODE ON A│
│ SIDE THE FIRST SUB-ELECTRODE OPPOSITE TO THE CENTER SUB-ELECTRODE,  │
│ AND A FOURTH SUB-ELECTRODE ON A SIDE THE SECOND SUB-ELECTRODE       │
│ OPPOSITE TO THE CENTER SUB-ELECTRODE                                │
│ 1702                                                                │
└─────────────────────────────────────────────────────────────────────┘
                                  ↓
┌─────────────────────────────────────────────────────────────────────┐
│ CONNECT THE CMUT ARRAY TO AN IMAGING SYSTEM, BIAS VOLTAGE SUPPLY    │
│ AND/OR MULTIPLEXOR                                                  │
│ 1704                                                                │
└─────────────────────────────────────────────────────────────────────┘
                                  ↓
┌─────────────────────────────────────────────────────────────────────┐
│ DIRECT THE CMUT ARRAY TOWARD AN OBJECT                              │
│ 1706                                                                │
└─────────────────────────────────────────────────────────────────────┘
                                  ↓
┌─────────────────────────────────────────────────────────────────────┐
│ CAUSE THE PLURALITY OF ELEMENTS TO TRANSMIT ULTRASONIC ENERGY WHILE │
│ APPLYING, AT A FIRST TIME, A FIRST BIAS VOLTAGE TO THE CENTER SUB-  │
│ ELECTRODE AND A SECOND BIAS VOLTAGE TO THE FIRST AND SECOND SUB-    │
│ ELECTRODES                                                          │
│ 1708                                                                │
└─────────────────────────────────────────────────────────────────────┘
                                  ↓
┌─────────────────────────────────────────────────────────────────────┐
│ INCREASE THE RESPECTIVE BIAS VOLTAGES APPLIED TO THE CENTER SUB-    │
│ ELECTRODE AND THE FIRST AND SECOND SUB-ELECTRODES OVER TIME AND, IN │
│ SOME EXAMPLES, AT DIFFERENT RATES                                   │
│ 1710                                                                │
└─────────────────────────────────────────────────────────────────────┘
                                  ↓
┌─────────────────────────────────────────────────────────────────────┐
│ APPLY, AT A SECOND TIME, A THIRD BIAS VOLTAGE TO THE THIRD AND FOURTH│
│ SUB-ELECTRODES DURING APPLICATION OF THE FIRST AND SECOND BIAS      │
│ VOLTAGES                                                            │
│ 1712                                                                │
└─────────────────────────────────────────────────────────────────────┘
                                  ↓
┌─────────────────────────────────────────────────────────────────────┐
│ INCREASE THE THIRD BIAS VOLTAGE OVER TIME AND, IN SOME EXAMPLES, AT A│
│ DIFFERENT RATE FROM THE FIRST AND SECOND BIAS VOLTAGES              │
│ 1714                                                                │
└─────────────────────────────────────────────────────────────────────┘
                                  ↓
┌─────────────────────────────────────────────────────────────────────┐
│ PRESENT AN IMAGE BASED ON THE RECEIVED REFLECTED ULTRASONIC ENERGY  │
│ 1716                                                                │
└─────────────────────────────────────────────────────────────────────┘
```

FIG. 17

BIAS CONTROL FOR CAPACITIVE MICROMACHINED ULTRASONIC TRANSDUCERS

TECHNICAL FIELD

Some examples herein relate to capacitive micromachined ultrasonic transducer (CMUTs), such as may be used for ultrasound imaging.

BACKGROUND

Ultrasound transducers are widely used in many different fields, including ultrasound imaging. In conventional modern medical imaging applications, ultrasound transducers are typically constructed from piezoelectric materials. One commonly used piezoelectric material is lead zirconate titanate (PZT). However, the impedance of PZT is usually higher than 30 MRayls, while the impedance of human tissue is approximately 1.5 MRayls. To reduce this large impedance mismatch, one or more matching layers may be placed between the PZT transducer and the tissue being imaged. Since the matching layers are typically selected based on the one-quarter-wavelength principle, the bandwidth of PZT transducers having matching layers may be limited to 80% or less bandwidth.

Capacitive micromachined ultrasonic transducers (CMUTs) have been developed for various applications including medical ultrasound imaging. CMUTs can be used without matching layers and therefore can operate with extremely wide bandwidths (e.g., greater than or equal to 100%). Similar to a PZT transducer, a CMUT transducer may be activated by electrical pulses to generate acoustic signals that propagate in tissues; however, unlike a PZT transducer, a CMUT transducer may employ an additional bias voltage, such as when receiving echo signals from tissues. Traditionally, the bias voltage may be a DC voltage that remains constant during imaging operations.

Additionally, ultrasound transducer arrays may be classified into three or more different array types, which include one-dimensional (1D) arrays, one-point-five-dimensional (1.5D) arrays, and two-dimensional (2D) arrays made up of multiple CMUT elements. For example, a 1D array may include multiple CMUT elements arranged in only one dimension, e.g., the lateral dimension. The spacing between two adjacent elements may be typically either one wavelength for a linear array or one-half wavelength for a phased array. A 1.5D array may include multiple elements in the lateral dimension and at least two sub-elements in the elevation dimension. The spacing between the two adjacent sub-elements may be much larger than the wavelength. A 2D array may include multiple elements arranged in both the lateral dimension and the elevation dimension. As one example, the spacing between two adjacent elements may be one-half wavelength in both the lateral and the elevation dimensions. The number of elements and sub-elements of 1.5D arrays and 2D arrays may be significantly larger than the number of channels of the respective imaging systems.

SUMMARY

Some implementations herein include techniques and arrangements for a CMUT having multiple identical CMUT cells. The CMUT may have two electrodes and at least one of the two electrodes may include multiple sub-electrodes. In some cases, the CMUT may include multiple regions corresponding to multiple sub-electrodes. For example, the CMUT may include a first region having a first sub-electrode, and a second region having a second sub-electrode. During use of the CMUT for at least one of sending or receiving ultrasonic energy, a processor may be configured to cause a bias voltage supply to supply a first bias voltage to the first sub-electrode and a second bias voltage to the second sub-electrode. For instance, the first bias voltage may be different from the second bias voltage.

As another example, some implementations herein include techniques and arrangements for a CMUT having different CMUT cells in different regions. The CMUT may have two electrodes and at least one of the two electrodes may include multiple sub-electrodes corresponding to multiple bias controllable regions. For example, the CMUT may include a first bias controllable region having one or more first CMUT cells including a first sub-electrode, and a second bias controllable region having one or more second CMUT cells including a second sub-electrode. The second CMUT cells may be different from the first CMUT cells, such as structurally different, functionally different, etc. During use of the CMUT for at least one of sending or receiving ultrasonic energy, a processor may be configured to cause a bias voltage supply to supply a first bias voltage to the first sub-electrode and a second bias voltage to the second sub-electrode. For instance, the first bias voltage may be different from the second bias voltage.

As another example, some implementations include a CMUT array that may include a plurality of elements, and each element has two electrodes and at least, one of two electrodes has multiple sub-electrodes. Each element may include a plurality of bias controllable regions and each bias controllable region may correspond to one or more sub-electrodes along an elevation direction. The CMUT cells in the different bias controllable regions may be the same or different. For instance, a first bias controllable region having a first sub-electrode and a second bias controllable region having a second sub-electrode may be disposed on opposite sides of a third bias controllable region having a third sub-electrode. In some cases, a first bias voltage may be applied to the third sub-electrode and a second bias voltage may be applied to the first and second sub-electrodes while causing at least one of the first bias controllable region, the second bias controllable region, or the third bias controllable region to transmit and/or receive ultrasonic energy. For example, the second bias voltage may be applied at a different voltage amount than the first bias voltage, and/or may be applied at a different timing than the first bias voltage.

As another example, some implementations include a multi-dimensional CMUT array (e.g., 1.25D, 1.5D, 1.75D, or the like) that may include a plurality of elements, and each element may include multiple sub-elements along an elevation direction. Each sub-element may include two electrodes, and at least one of the two electrodes may include multiple sub-electrodes. Each sub-element may include a plurality of bias controllable regions and each bias controllable region may correspond to a sub-electrode along the elevation direction. For instance, a first bias controllable region may include a first sub-electrode and a second bias controllable region may include a second sub-electrode. In some cases, a first bias voltage may be applied to the first sub-electrode and a second bias voltage may be applied to the second sub-electrode while causing at least one of the first region or the second region to transmit and/or receive ultrasonic energy. For example, the second bias voltage may be applied at a different voltage amount than the first bias voltage, and/or may be applied at a different timing than the first bias voltage.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIGS. 15A-15B illustrate graphs showing examples of focus depth and bias voltage according to some implementations.

FIG. 17 is a flow diagram illustrating an example process for applying bias voltages to sub-elements according to some implementations.

DETAILED DESCRIPTION

Figure 1A:
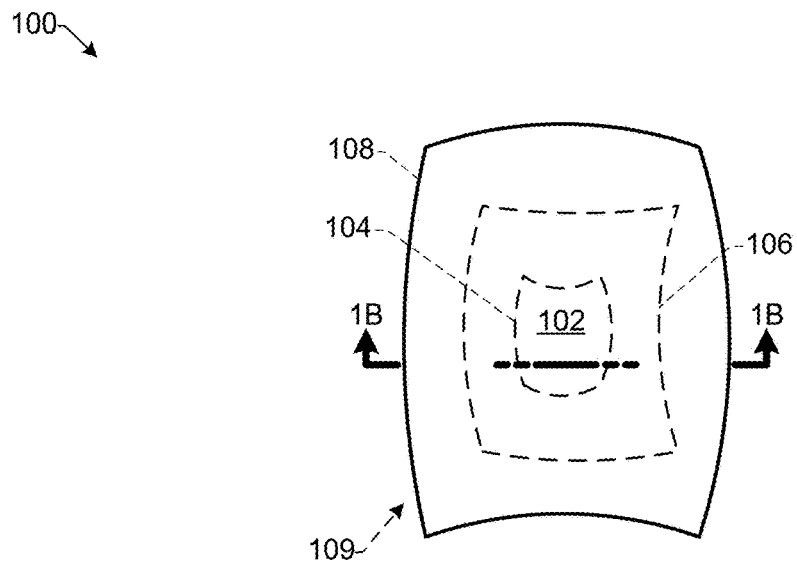
FIGS. 1A-1D illustrate an example CMUT according to some implementations.

Some implementations herein include techniques and arrangements for selectively changing elevation aperture size and/or apodization pattern for a CMUT, an element or a sub-element in a CMUT array, or other CMUT. For instance, the change of aperture and/or apodization may be achieved by adjusting the bias voltages applied to selected regions of the CMUT. As one example, different bias voltages may be applied at different bias controllable regions in a CMUT, which enables the properties of the CMUT to be varied individually in the different bias controllable regions. Accordingly, in some cases, the bias voltage may be adjusted to control the effective aperture size and/or apodization pattern of the CMUT. Furthermore, in some implementations, the bias voltage may be varied with time so that the effective aperture size and/or apodization pattern of the CMUT may be varied with time accordingly. The change may be continuous or discrete, such as including multiple stepped changes.

Some implementations herein include CMUTs able to be used for various ultrasound applications, including ultrasound imaging. For instance, the effective aperture and/or apodization for a CMUT array may be controlled to achieve a desired functionality. In some cases, the aperture and/or apodization of the CMUT array may be controllably changed with time by changing a bias voltage applied to CMUT elements, sub-elements, or regions of CMUT elements or sub-elements within the array. Furthermore, a continuous change of aperture size and/or apodization pattern may be achieved by gradually changing the CMUT bias voltage over time. Some examples include applying different bias voltages to the different bias controllable regions of an element or sub-element in a CMUT array and the applied bias voltage may be either a constant, as in the case of direct current (DC), or a function that varies with time, as in the case of an alternating current (AC).

Further, some implementations include operating a CMUT, which may be an element or sub-element in a CMUT array (e.g., a 1D, 1.25D, 1.5D, 1.75D, or 2D array), with different bias voltages in at least two bias controllable regions. For instance, some examples may include supplying different bias voltages to different bias controllable regions of a CMUT element or a CMUT sub-element in a CMUT array and generating an increasing bias voltage.

A CMUT, such as an element or sub-element of a CMUT array, may include at least two electrodes arranged proximate to each other with a transducing space between them. One of the two electrodes is moveable toward and away from the other to perform the energy conversion between acoustic energy and electrical energy. The movement of the electrode couples the acoustic energy with an adjacent medium. In some examples herein, the transducing efficiency of the respective CMUTs may be at least partially based on the bias voltage applied between the two electrodes and, accordingly, implementations herein may use the bias voltage to control the transducing efficiency.

The transducing efficiency may include transmission (TX) sensitivity, receiving (RX) sensitivity, or a combination of both TX sensitivity and RX sensitivity. The frequency response (e.g., center frequency, bandwidth, etc.) of the CMUTs herein may be at least partially determined by the mechanical properties (e.g., the resonant frequencies) of the CMUT structure and the medium. For example, for a CMUT with a vibrating membrane, the center frequency of the CMUT is at least partially determined by the resonant frequency (especially first resonant frequency) of the membrane and the loading of the medium. For instance, by using the bias voltage to alter the mechanical properties of the CMUT structures (e.g., change the boundary condition), the bias voltage may be used to control the frequency response of the CMUT.

In some implementations, at least one of first or second electrodes in a CMUT includes at least two sub-electrodes, and the bias voltage applied to each of the sub-electrodes may be individually controlled. Thus, the transducing efficiency in the region associated with each sub-electrode in a CMUT may be controlled at least partially based on the bias voltage applied to the individual sub-electrodes. In addition, the frequency response (e.g., at least one of the center frequency or the resonant frequency) of the CMUT structures of the CMUT in the region of each sub-electrode may be designed to be the same or different from those of others of the CMUT structures. Moreover, the frequency response of a CMUT in a region can be further controlled or changed by the bias voltage applied in the region. Thus, the CMUT performance (transducing efficiency, frequency response, etc.) in the region of each sub-electrode may be controlled individually by the bias voltage applied to it. For example, when a first bias voltage on a first sub-electrode is different from a second bias voltage on a second sub-electrode, the CMUT performance (transducing efficiency, frequency response, etc.) in a first region with the first sub-electrode may be different from that in the second region with second sub-electrode.

In some implementations, for one electrode of a CMUT comprising at least two sub-electrodes, a first sub-electrode may be located closer to the center of the transducer than a second sub-electrode. The different bias voltages may be applied to the sub-electrodes, so that the transducing efficiency in the region of the first sub-electrode is higher than that in the region of the second sub-electrode. Moreover, the center frequency of CMUT cells in the region of the first sub-electrode may be designed or changed to be higher or lower than that in the region of the second sub-electrode. Furthermore, the sub-electrodes of one electrode in a CMUT may be configured symmetrically from the center of the electrode in one or more lateral directions (e.g., elevational or azimuth direction in a 1D array) or any lateral directions (e.g., concentric symmetry in an annular shape transducer). Additionally, a bias voltage applied to at least one sub-electrode of the electrode may vary with time to achieve a desired aperture/apodization change with time.

In addition, a bias voltage applied to at least one sub-electrode of an electrode may vary based on different imaging depths to achieve a desired aperture size/apodization for different imaging depths. Further, the transducing efficiency controlled by the bias voltages may be higher in a region closer to a center of a CMUT than that in a region closer to an edge of the CMUT. Additionally, the center frequency controlled by the bias voltages may be higher in the region closer to the center of the CMUT than that in the region closer to the edge. As one example, for a 1D array, there may be at least two generally identical elements, and each identical element may have at least one electrode having multiple sub-electrodes. The corresponding sub-electrodes in the elements may be connected to the same bias voltage. Accordingly, the effective aperture/apodization of all the elements controlled by the bias voltages may be identical.

An apodization profile is a window function that weighs more in the center and less toward both edges. In ultrasound imaging, apodization may be utilized to shape ultrasound beam patterns and reduce side lobe levels for obtaining better image quality. For instance, a center sub-element or region at the center of an array may have more acoustic output intensity than the sub-elements or regions near the edges of the array, which may generate acoustic fields with minimum side lobes. Furthermore, the center frequency and transducing efficiency are two useful performance parameters for a CMUT. The center frequency may also be referred to as a −6 dB center frequency. For examples, if the lower frequency limit of −6 dB bandwidth is $f_{low}$ and the upper frequency limit of −6 dB bandwidth is $f_{high}$, then the center frequency is $(f_{low}+f_{high})/2$. In some cases, the center frequency can be also defined by −10 dB or −20 dB bandwidth. No matter which definition, usually the center frequency is determined at least partially by the resonant frequency of a CMUT cell structure (e.g., the resonant frequency of a membrane over a cavity in a CMUT cell). Typically, the higher the resonant frequency of a CMUT cell structure, then the higher the center frequency.

Furthermore, in implementations herein, transducing efficiency may include the CMUT transmission efficiency, receiving sensitivity, or both (i.e., loop sensitivity). For example, both the transmission efficiency and the receiving sensitivity may be determined by the intensity of the electrical field within the transducing space (i.e., the gap between two electrodes of a CMUT including the CMUT cavity). A higher electrical intensity results in a higher transmission efficiency and a higher receiving sensitivity. For a given cavity geometry (e.g., depth, shape, profile, etc.), the electrical intensity in the transducing space may be determined by the applied bias voltage.

For discussion purposes, some example implementations are described in the environment of ultrasound imaging. However, implementations herein are not limited to the particular examples provided, and may be extended to other applications, other systems, other environments for use, other array configurations, and so forth, as will be apparent to those of skill in the art in light of the disclosure herein.

FIGS. 1A-1D illustrate an example CMUT 100 according to some implementations. FIG. 1A illustrates an example plan top view of the CMUT 100, which may have any transducer shape in some implementations. In this example, the CMUT 100 includes a first (e.g., upper) electrode 102 and three electrically separated sub-electrodes 104, 106, and 108 which are located under the first electrode 102 in this view, and to which different bias voltages may be independently applied. Together, the sub-electrodes 104-108 make up a second (e.g., bottom) electrode 109 for the CMUT 100. As shown by dashed lines, the CMUT 100 includes a center first sub-electrode 104, a concentric second sub-electrode 106 surrounding the first sub-electrode 104, and an outer concentric third sub-electrode 108 surrounding the second sub-electrode 106 and the first sub-electrode 104. The first electrode 102 and the sub-electrodes 104-108 may be flat or otherwise planar in this example, but are not limited to such in other examples.

Figure 1B:
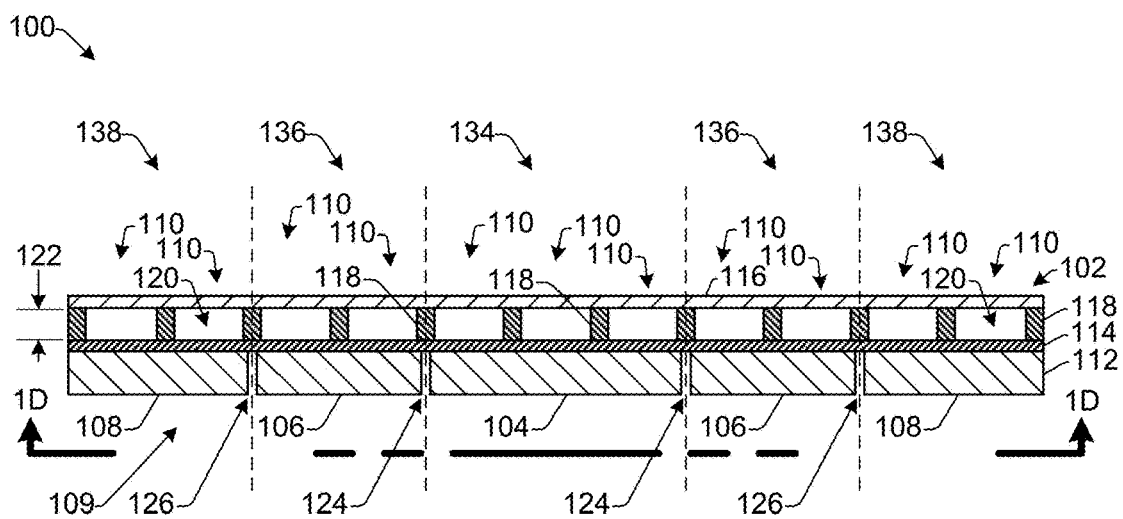

FIG. 1B illustrates an example cross-sectional view of the CMUT 100 as viewed along line 1B-1B of FIG. 1A according to some implementations. In this example, a plurality of CMUT cells 110 are formed on a substrate 112. In some examples, the substrate 112 may be formed of a conductive material and may serve as the second electrode 109 for the CMUT cells 110. In other examples, such as in the case that the substrate 112 is formed of a nonconductive material, a layer of conductive material may be deposited onto an upper surface of the substrate 112 to serve as the second electrode 109, such as prior to deposition of an optional insulation layer 114, which may be disposed on an upper surface of the substrate 112.

An elastic membrane 116 may be disposed over the substrate 112 and may be supported by a plurality of sidewalls 118 to provide a plurality of cavities 120 corresponding to individual CMUT cells 110, respectively, e.g., one cavity 120 per CMUT cell 110. In the illustrated example, the membrane 116 may have a uniform thickness over the cavities 120; however, in other examples, the thickness or other properties of the membrane 116 may vary, which may vary the frequency and/or other properties of the CMUT cells 110. The membrane 116 may be made of single layer or multiple layers, and at least one layer may be of a conductive material to enable the membrane 116 to serve as the first electrode 102.

The membrane 116 may be made of an elastic material to enable the membrane 116 to move toward and away from the substrate 112 within a transducing gap 122 provided by the cavities 120. For example, the membrane 116, as the first electrode 102, may be deformed by applying an AC voltage (TX) between the first electrode 102 and the second electrode 109, or may be deformed by an impinging ultrasound wave (RX). Thus, the membrane 116 is able to move back and forth within the transducing gap 122 in response to an electrical signal when producing ultrasonic energy (TX), or in response to receiving ultrasonic energy (RX). Factors that can affect the resonant frequency of CMUT cells 110 include the length and width of the respective cavities 120, which correspond to the membrane area over each cavity, and membrane stiffness, which may at least partially correspond to the membrane thickness over each cavity 120 and membrane material. Furthermore, by applying a bias voltage to the CMUT cells 110, an initial load may be placed on the membrane 116, which may change the resonant frequency of the respective CMUT cells 110.

In the illustrated example, the substrate 112 is separated into three separate concentric parts by separation gaps. Accordingly, a first separation gap 124 may electrically isolate the first sub-electrode 104 from the second sub-electrode 106, and a second separation gap 126 may electrically isolate the first sub-electrode 104 and the second sub-electrode 106 from the third sub-electrode 108. Adherence of the respective substrate portions to the insulation layer 114 and/or to the sidewalls 118 may at least partially maintain the structural integrity of the CMUT 100. In addition, in some examples, the insulative material of the insulation layer 114, or other insulative material may be filled, at least partially, into the separation gaps 124 and 126, such as to maintain the structural integrity. In some case, the substrate may be bonded (attached) to a third substrate (e.g., an IC wafer/chip, PCB board, glass wafer/chip, etc.).

Separate bias voltages may be applied to the respective sub-electrodes 104, 106, and 108, creating separate bias controllable regions 134, 136, and 138, respectively, having different transducing properties. For example, the bias voltage in the regions 134-138 corresponding to the different sub-electrodes 104-108 may be independently controlled to control the transducing properties of each bias controllable region 134-138. At least one CMUT performance parameter (e.g., transducing efficiency, frequency response, or the like) may be made different in the different regions 134-138 by controlling the bias voltages applied to the sub-electrodes 104-108 corresponding to each bias controllable region 134-138. Consequently, the bias voltage applied on each sub-electrode 104-108 may be used to turn on and off the function of the transducer or change the performance parameter(s) in the respective bias controllable region 134-138 corresponding to each sub-electrode 104-108. Furthermore, if the bias voltage in a region changes with time, then the CMUT performance parameter(s) in the bias controllable region may also change with time accordingly. As one example, the transducing efficiency of the CMUT structures in the bias controllable region 134 closer to the center may be controlled to be higher than that in the region 138 closer to the edge of the CMUT 100. Thus, by controlling the bias voltages in each bias controllable region 134-138, the effective aperture or/and apodization of the CMUT 100 may be controlled and changed accordingly.

In addition, the structure of the CMUT cells 110 in each bias controllable region 134-138 may be configured differently. For example, the center frequency (or first resonant frequency) of the CMUT cells 110 in each bias controllable region 134-138 may be designed differently from the CMUT cells 110 in the other bias controllable regions 134-138. As one example, the center frequency of the CMUT cells in the bias controllable region closer to the center may be configured to be higher than that of the CMUT cells in the bias controllable region closer to the edge. For example, the CMUT cells 110 in the bias controllable region 134 may be configured to have a higher center frequency than the CMUT cells 110 in the region 136, and CMUT cells 110 in the bias controllable region 136 may be configured to have a higher center frequency than the CMUT cells 110 in the bias controllable region 138.

Figure 1C:
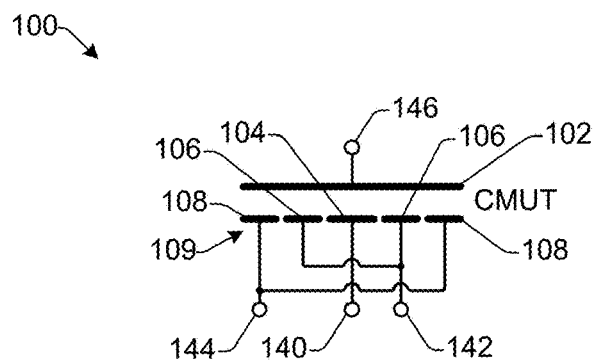

FIG. 1C is an example electrical schematic of the CMUT 100 according to some implementations. In FIG. 1C, the CMUT 100 may be simplified as a variable capacitor with the first electrode 102 and the second electrode 109, which includes the multiple sub-electrodes 104, 106 and 108. Each sub-electrode 104-108 may have a different bias voltage applied. Thus, the first sub-electrode 104 may have a first electrical connection 140, the second sub-electrode 106 may have a second electrical connection 142, the third sub-electrode 108 may have a third electrical connection 144, and the upper electrode 102 may have a fourth electrical connection 146. As discussed additionally below, the first electrical connection 140, the second electrical connection 142, and the third electrical connection 144 may be connected to different bias voltages and the fourth electrical connection 146 may be connected to ground or other drain.

Figure 1D:
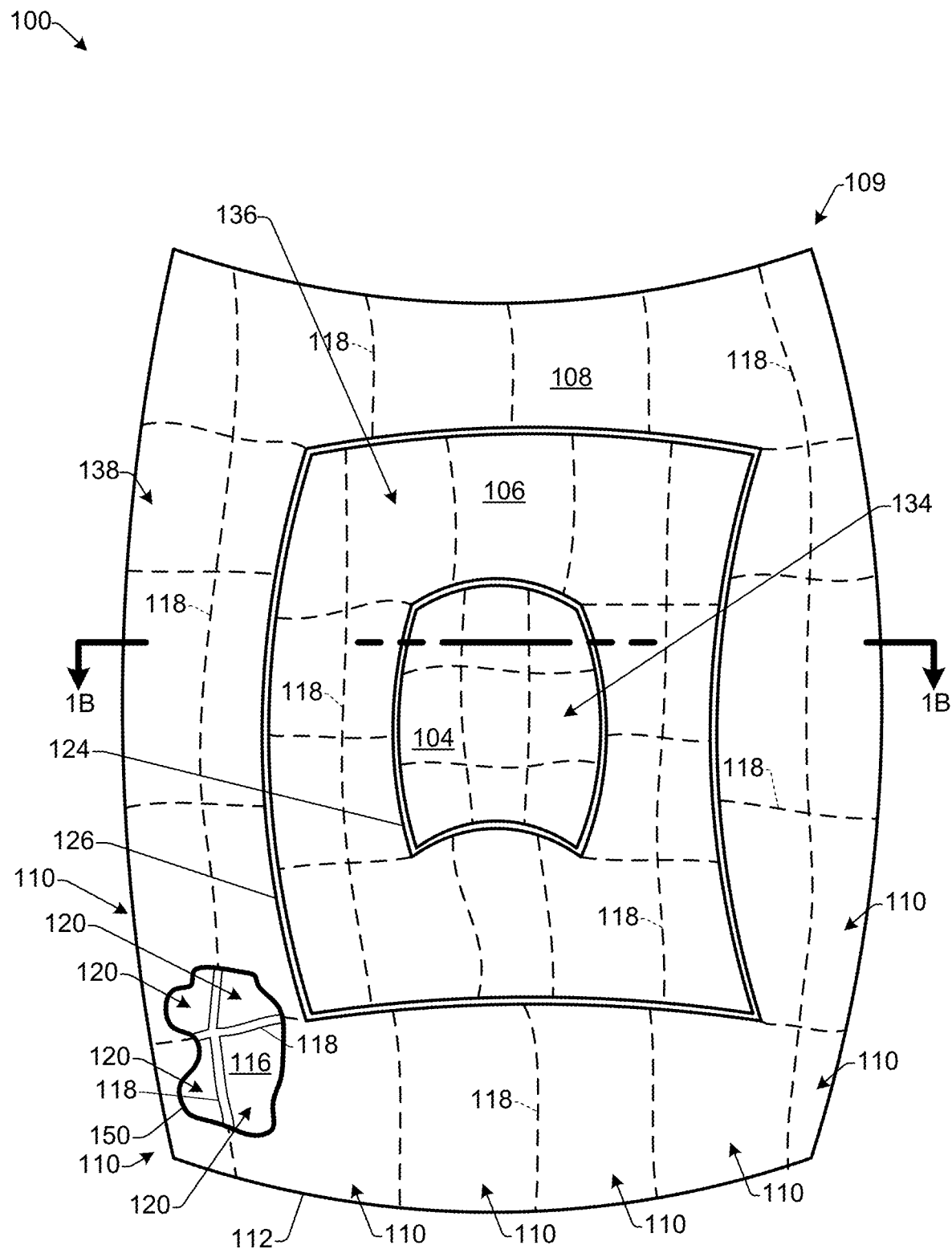

FIG. 1D illustrates an example plan bottom view of the CMUT 100, such as viewed in the direction of line 1D-1D of FIG. 1B. This example shows the first separation gap 124 that electrically isolates the first sub-electrode 104 from the second sub-electrode 106, and the second separation gap 126 that electrically isolates the first sub-electrode 104 and the second sub-electrode 106 from the third sub-electrode 108. In addition, the dashed lines represent the sidewalls 118 bounding the cavities 120 of the individual CMUT cells 110, as illustrated, e.g., at the cutaway portion 150.

The moveable portion the membrane 116 disposed over each cavity 120 has an area that, along with the stiffness of the membrane 116, at least partially determines the resonant frequency of the individual CMUT cells 110. For instance, a CMUT cell 110 having a smaller membrane area may have a higher resonant frequency than a CMUT cell 110 having a larger membrane area, assuming that the membrane thickness and other variables are constant for both CMUT cells 110. Accordingly, by changing the dimensions of the cavities (and thereby the membrane areas), e.g., when viewed in plan, as in FIG. 1D, the resonant frequencies of the respective CMUT cells may vary. Further, the CMUT cells may be constructed in any desired shape and are not limited to the examples illustrated herein.

Alternatively, in some examples, the thickness of the membrane 116 is not uniform over the cavities 120. For instance, instead of changing the dimensions of the cavities 120 and the area of the membrane 116, the membrane thickness profile may be different over different CMUT cells 110. For example, forming successively thinner membrane thicknesses or more flexible membranes over CMUT cells, such as toward the edges may also be used to control the frequency profile.

Additionally, while the second electrode is divided into sub-electrodes in this example, in other examples, the first electrode 102 may be divided into multiple sub-electrodes in addition to, or in alternative to, the second electrode 109. Further, the particular CMUT structure illustrated in FIGS. 1A-1D is for discussion purposes only, and implementations herein may be applied to other CMUT structures, such as a CMUT with an embedded spring.

Figure 2A:
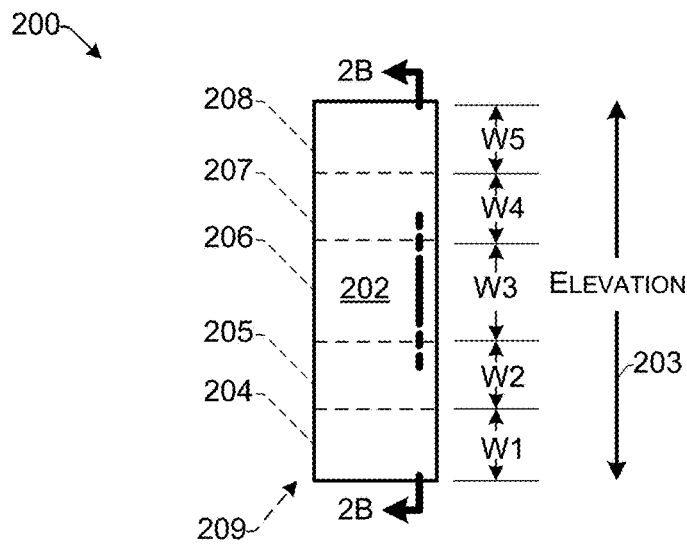
FIG. 2A-2D illustrate an example CMUT element according to some implementations.

FIGS. 2A-2D illustrate an example CMUT element 200 according to some implementations. FIG. 2A illustrates an example plan top view of the CMUT element 200 extending in an elevation direction 203. In some examples, the CMUT element 200 may be included in an array with a plurality of CMUT elements, which may be of a similar configuration or of a different configuration from each other. In this example, the CMUT element 200 includes a first (e.g., upper) electrode 202 and five electrically separated sub-electrodes 204, 205, 206, 207, and 208 which are located under the first electrode 202 in this view, and to which different bias voltages may be independently applied. Together, the sub-electrodes 204-208 make up a second (e.g., bottom) electrode 209 for the CMUT element 200. As shown by dashed lines, the CMUT element 200 includes a first sub-electrode 204, a second sub-electrode 205 adjacent to the first sub-electrode 204, a third sub-electrode 206 adjacent to the second sub-electrode 205, a fourth sub-electrode 207 adjacent to the third sub-electrode 206, and a fifth sub-electrode 208 adjacent to the fourth sub-electrode 207. The first electrode 202 and the sub-electrodes 204-208 may be flat or otherwise planar in this example, but are not limited to such in other examples. Bias controllable regions 234, 235, 236, 237, 238, corresponding to the sub-electrodes 204, 205, 206, 207 and 208, respectively, may have the same CMUT cell structure or different CMUT structures from others of the bias controllable regions 234, 235, 236, 237, 238.

Widths W1, W2, W3, W4, W5 of the bias controllable regions 234, 235, 236, 237, 238, respectively, may be different from others of widths W1, W2, W3, W4, W5. As one example, W1 may be the same as W5 and the cells in bias controllable regions 234 and 238 with sub-electrodes 204 and 208, respectively, may have the same dimensions; W2 may be the same as W4, but may be different from W1 and W5, and the cells in bias controllable regions 235 and 237 with sub-electrodes 205 and 207, respectively, may have the same dimensions, but may have dimensions different from the cells in bias controllable regions 234, 238, and 236, with sub-electrodes 204, 208 and 206; and W3 may be different from W1, W2, W4, and W5, and the CMUT cells in the region 236 with sub-electrode 206 may have dimensions different from the CMUT cells in the regions 234, 235, 237, and 238, with sub-electrodes 204, 205, 207, and 208, respectively. In other examples, some or all of the regions 234-238 with sub-electrodes 204-208, respectively, may have CMUT cells that are the same dimensions and/or some or all of W1, W2, W3, W4, and W5 may be the same.

Figure 2B:
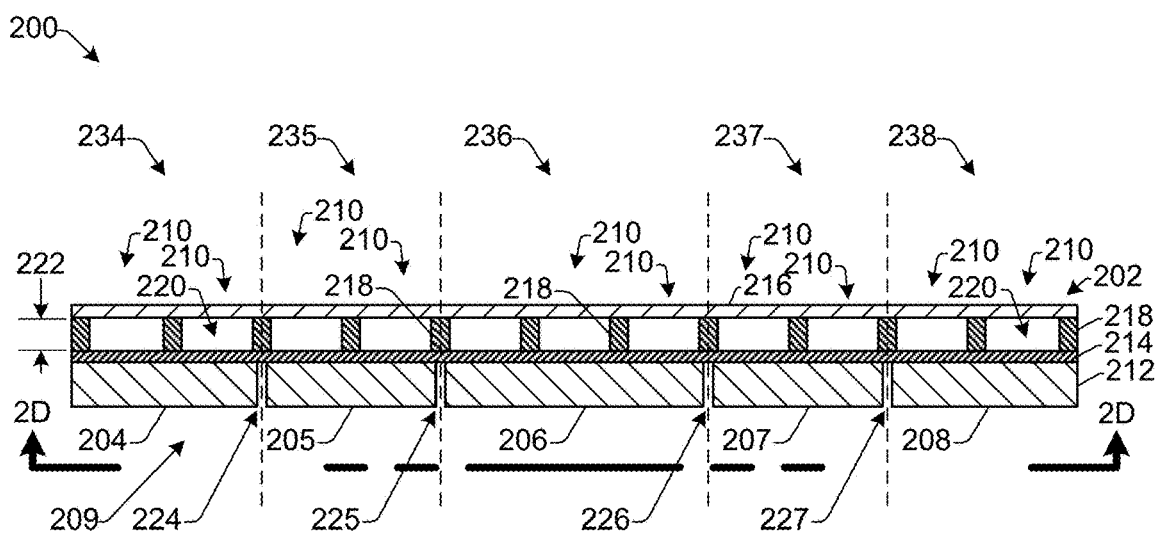

FIG. 2B illustrates an example cross-sectional view of the CMUT element 200 as viewed along line 2B-2B of FIG. 2A according to some implementations. In this example, a plurality of CMUT cells 210 are formed on a substrate 212. In some examples, the substrate 212 may be formed of a conductive material and may serve as the second electrode 209 for the CMUT cells 210. In other examples, such as in the case that the substrate 212 is formed of a nonconductive material, a layer of conductive material (not shown in FIG. 2B) may be deposited onto an upper surface of the substrate 212 to serve as the second electrode 209, such as prior to deposition of an optional insulation layer 214, which may be disposed on an upper surface of the substrate 212.

An elastic membrane 216 may be disposed over the substrate 212 and may be supported by a plurality of sidewalls 218 to provide a plurality of cavities 220 corresponding to individual CMUT cells 210, respectively, e.g., one cavity 220 per CMUT cell 210. In the illustrated example, the membrane 216 may have a uniform thickness over the cavities 220; however, in other examples, the thickness or other properties of the membrane 216 may vary, which may vary the frequency and/or other properties of the CMUT cells 210. The membrane 216 may be made of single layer or multiple layers, and at least one layer may be of a conductive material to enable the membrane 216 to serve as the first electrode 202.

The membrane 216 may be made of an elastic material to enable the membrane 216 to move toward and away from the substrate 212 within a transducing gap 222 provided by the cavities 220. For example, the membrane 216, as the first electrode 202, may be deformed by applying an AC voltage (TX) between the first electrode 202 and the second electrode 209, or may be deformed by an impinging ultrasound wave (RX). Thus, the membrane 216 is able to move back and forth within the transducing gap 222 in response to an electrical signal when producing ultrasonic energy (TX), or in response to receiving ultrasonic energy (RX). Factors that can affect the resonant frequency of CMUT cells 210 include the length and width of the respective cavities 220, which correspond to the membrane area over each cavity, and membrane stiffness, which may at least partially correspond to the membrane thickness over each cavity 220 and membrane material. Furthermore, by applying a bias voltage to the CMUT cells 210, an initial load may be placed on the membrane 216, which may change the resonant frequency of the respective CMUT cells 210.

In the illustrated example, the substrate 212 is separated into five separate adjacent parts by separation gaps. Accordingly, a first separation gap 224 may electrically isolate the first sub-electrode 204 from the second sub-electrode 206, a second separation gap 225 may electrically isolate the second sub-electrode 205 from the third sub-electrode 206, a third separation gap 226 may electrically isolate the third sub-electrode 206 from the fourth sub-electrode 207, and a fourth separation gap 227 may electrically isolate the fourth sub-electrode 207 from the fifth sub-electrode 208. Adherence of the respective substrate portions to the insulation layer 214 and/or to the sidewalls 218 may at least partially maintain the structural integrity of the CMUT element 200. In addition, in some examples, the insulative material of the insulation layer 214, or other insulative material may be disposed in the separation gaps 224-227.

Separate bias voltages may be applied to the respective sub-electrodes 204, 205, 206, 207, and 208, corresponding to the separate bias controllable regions 234, 235, 236, 237, and 238, respectively, which may cause different transducing properties. For examples, the bias voltage in the bias controllable regions 234-238 corresponding to the different sub-electrodes 204-208 may be independently controlled to control the transducing properties of each bias controllable region 234-238. At least one CMUT performance parameter (e.g., transducing efficiency, frequency response, or the like) may be made different in the different bias controllable regions 234-238 by controlling the bias voltages applied to the sub-electrodes 204-208 corresponding to each bias controllable region 234-238. Consequently, the bias voltage applied on each sub-electrode 204-208 may be used to turn on and off the function of the transducer or change the performance parameter(s) in the respective bias controllable region 234-238 corresponding to each sub-electrode 204-

208. Furthermore, if the bias voltage in a region changes with time, then the CMUT performance parameter(s) in the region may also change with time accordingly. As one example, the transducing efficiency of the CMUT structures in the region 236 closer to the center may be controlled to be higher than that in the regions 234 and 238 closer to the edges of the CMUT element 200. Thus, by controlling the bias voltages in each bias controllable region 234-238, the effective aperture or/and apodization of the CMUT element 200 may be controlled and changed accordingly.

In addition, the structure of the CMUT cells 210 in each bias controllable region 234-238 may be configured differently. For example, the center frequency (or first resonant frequency) of the CMUT cells 210 in each bias controllable region 234-238 may be designed differently from the CMUT cells 210 in the other bias controllable regions 234-238. For example, the membrane of the CMUT cells in each region may have a different shape, width, length, or thickness. For example, the membrane dimensions of the CMUT cells 210 (e.g., width, length, and/or thickness) may vary from one bias controllable region 234, 235, 236, 237, 238, to another. As one example, the center frequency of the CMUT cells in the regions closer to the center may be configured to be higher than that of the CMUT cells in the regions closer to the edge. For example, the CMUT cells 210 in the region 236 may be configured to have a higher center frequency than the CMUT cells 210 in the regions 235 and 237, and the CMUT cells 210 in the regions 235 and 237 may be configured to have a higher center frequency than the CMUT cells 210 in the regions 234 and 238.

Figure 2C:
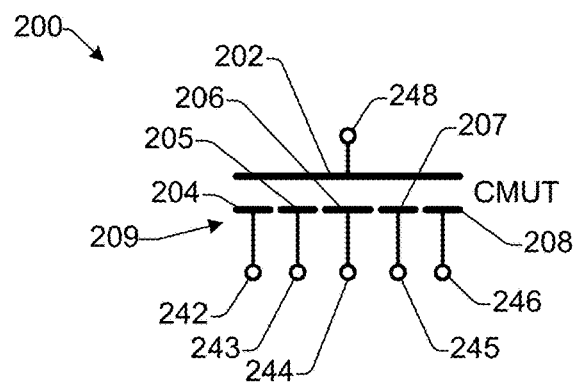

FIG. 2C is an example electrical schematic of the CMUT element 200 according to some implementations. In FIG. 2C, the CMUT element 200 may be simplified as a variable capacitor with the first electrode 202 and the second electrode 209, which includes the multiple sub-electrodes 204-208. Each sub-electrode 204-208 may have a different bias voltage applied. Thus, the first sub-electrode 204 may have a first electrical connection 242, the second sub-electrode 205 may have a second electrical connection 243, the third sub-electrode 206 may have a third electrical connection 244, the fourth sub-electrode 207 may have a fourth electrical connection 245, the fifth sub-electrode 208 may have a fifth electrical connection 246 and the upper electrode 202 may have a sixth electrical connection 248. As discussed additionally below, the first electrical connection 242, the second electrical connection 243, the third electrical connection 244, the fourth electrical connection 245 and the fifth electrical connection 246 may be connected to different bias voltages, and the sixth connection 248 may be connected to ground or other drain. In some examples, the performances of the regions in the CMUT element 200 may be configured to be symmetric around the center of the CMUT element 200. Therefore, the bias voltages applied on the sub-electrodes 204-208 may also be symmetric. For example, the performance parameters in regions 234 and 238 may be the same or similar, and the bias voltages applied on sub-electrodes 204 and 208 may be the same or similar. Further, the performance parameters in regions 235 and 237 may be the same or similar, and the bias voltages applied on sub-electrodes 205 and 207 may be the same or similar.

Figure 2D:
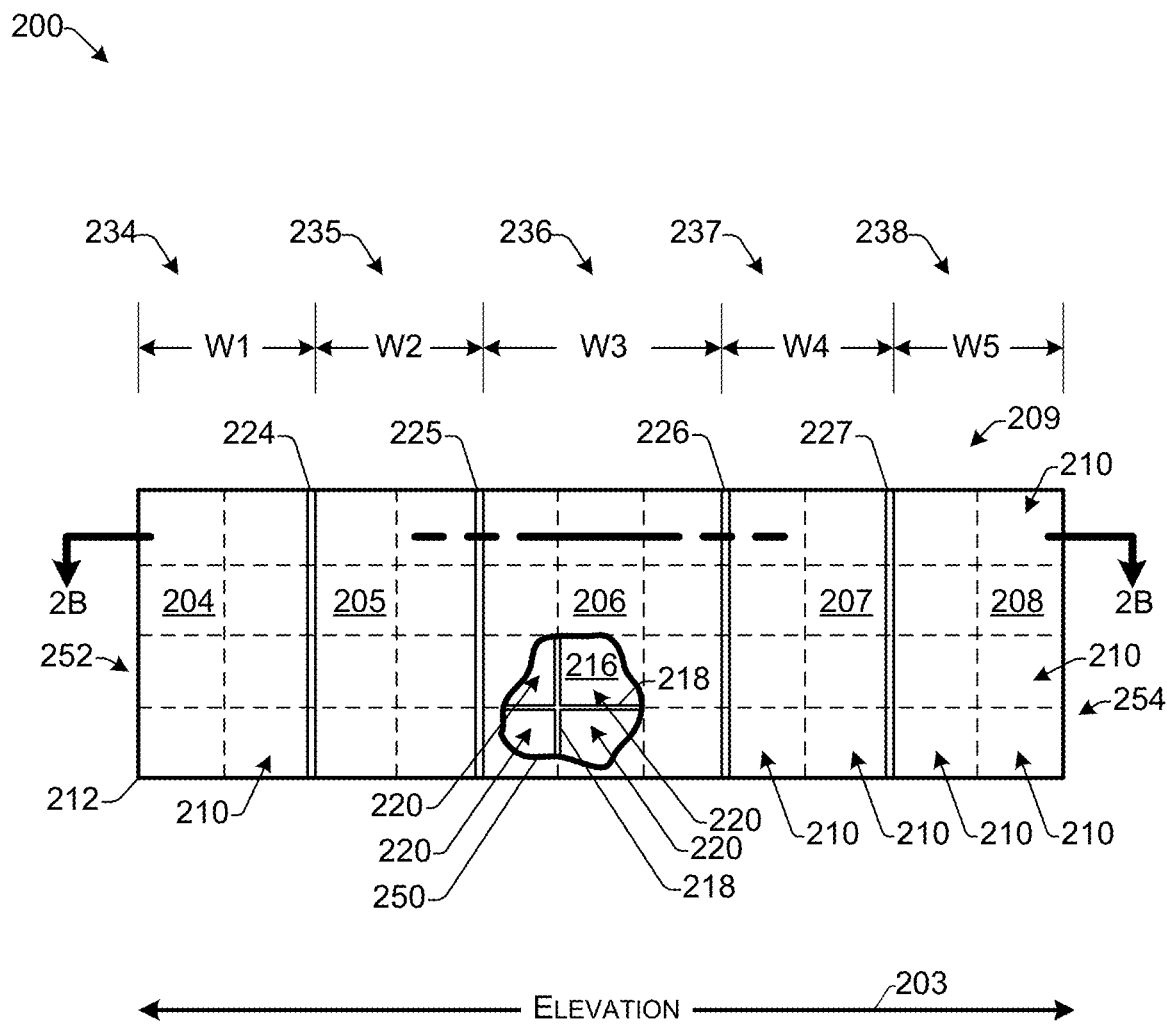

FIG. 2D illustrates an example plan bottom view of the CMUT element 200, such as viewed in the direction of line 2D-2D of FIG. 2B. This example shows the first separation gap 224 that electrically isolates the first sub-electrode 204 from the second sub-electrode 205, the second separation gap 225 that electrically isolates the second sub-electrode 205 from the third sub-electrode 206, the third separation gap 226 that electrically isolates the third sub-electrode 206 from the fourth sub-electrode 206, and the fourth separation gap 227 that electrically isolates the fourth sub-electrode 207 from the fifth sub-electrode 208. In addition, the dashed lines represent the sidewalls 218 bounding the cavities 220 of the individual CMUT cells 210, as illustrated, e.g., at the cutaway portion 250.

The moveable portion the membrane 216 disposed over each cavity 220 has an area that, along with the stiffness of the membrane 216, at least partially determines the resonant frequency of the individual CMUT cells 210. For instance, a CMUT cell 210 having a smaller membrane area may have a higher resonant frequency than a CMUT cell 210 having a larger membrane area, assuming that the membrane thickness and other variables are constant for both CMUT cells 210. Accordingly, by changing the dimensions of the cavities (and thereby the membrane areas), e.g., when viewed in plan, as in FIG. 2D, the resonant frequencies of the respective CMUT cells may vary.

Further, the CMUT cells 210 may be constructed in any desired shape and are not limited to the examples illustrated herein. For example, rather than having square or otherwise rectangular shaped CMUT cells when viewed in plan, the CMUT cells 210 may have membranes (cavities) of various other shapes or any combination of shapes such as hexagonal, circular, triangular, trapezoidal, and so forth.

Alternatively, in some examples, the thickness of the membrane 216 is not uniform over the cavities 220. For instance, instead of changing the dimensions of the cavities 220 and the area of the membrane 216, the membrane thickness profile may be different over different CMUT cells 210. For example, forming successively thinner membrane thicknesses or more flexible membranes over CMUT cells, such as toward the edges 252 and 254 may also be used to control the frequency profile.

Additionally, while the second electrode 209 is divided into sub-electrodes in this example, in other examples, the first electrode 202 may be divided into multiple sub-electrodes in addition to, or in alternative to, the second electrode 209. Further, the particular CMUT structure illustrated in FIGS. 2A-2D is for discussion purposes only, and implementations herein may be applied to other CMUT structures, such as a CMUT with an embedded spring.

In some examples, the CMUT cells, elements, and arrays herein may include one or more of the structures described in U.S. patent application Ser. No. 14/944,404, entitled "Capacitive Micromachined Ultrasound Transducers Having Varying Properties", filed Nov. 18, 2015, which is incorporated herein by reference in its entirety.

Figure 3A:
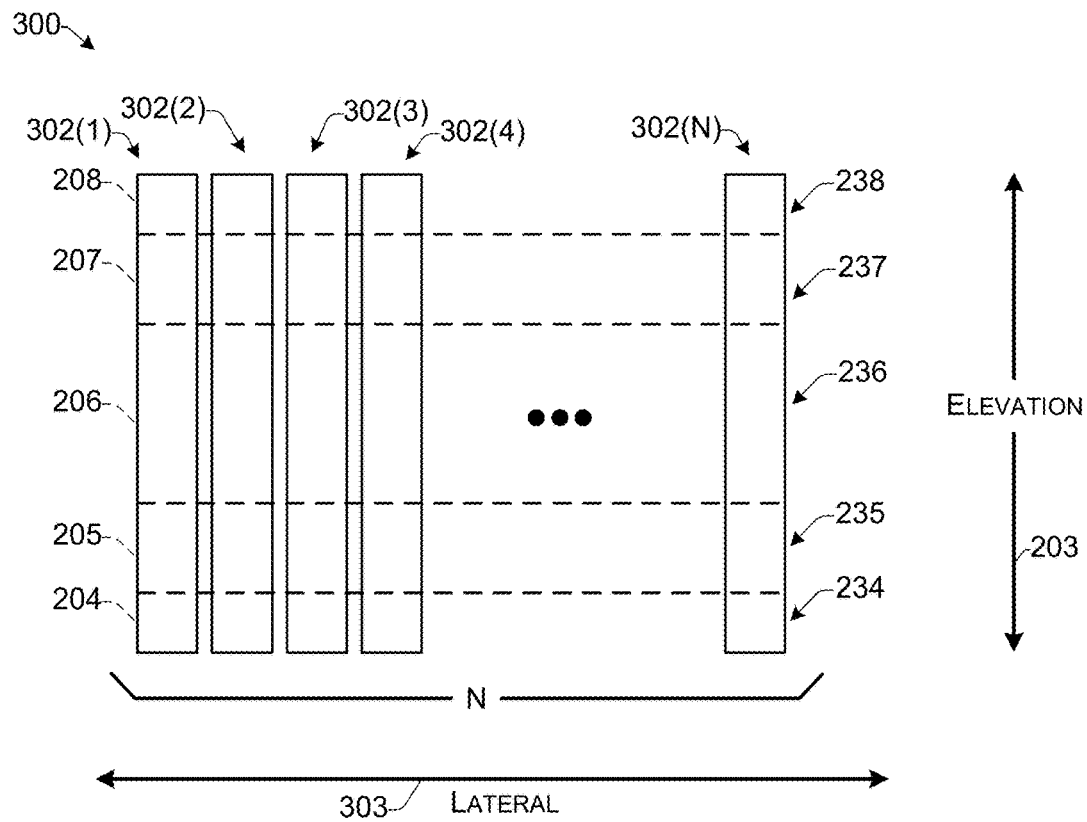
FIGS. 3A-3D illustrate examples of CMUT arrays according to some implementations.
Figure 3B:
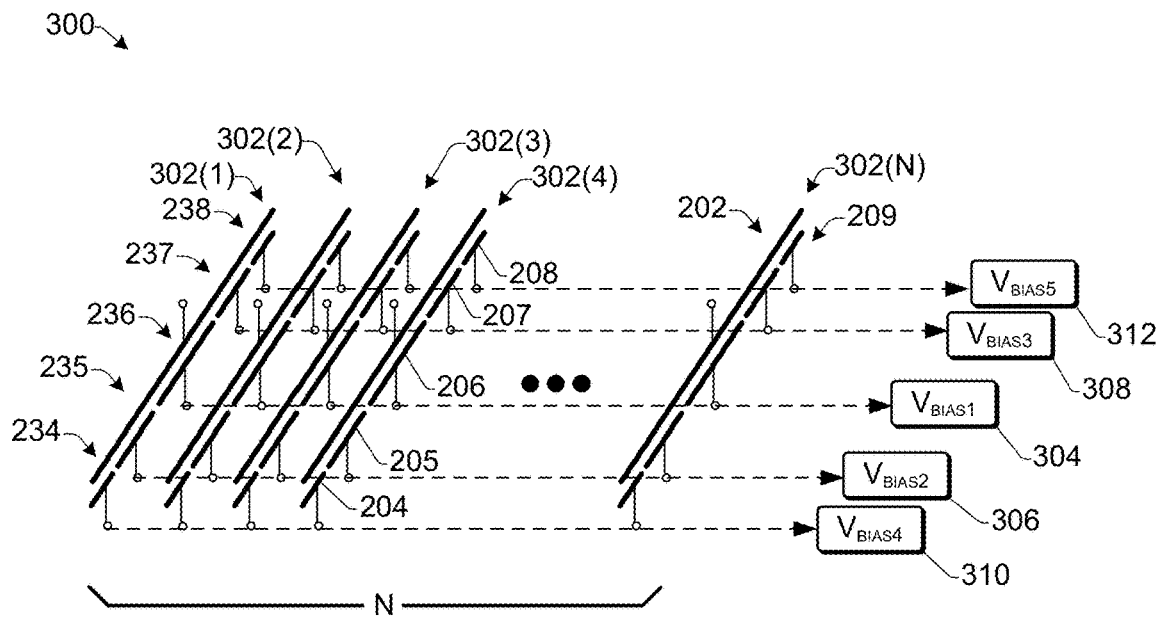

FIGS. 3A-3B illustrate an example CMUT array 300 according to some implementations. FIG. 3A illustrates an example of a 1D CMUT array 300 having N CMUT elements 302(1), 302(2), 302(3), 302(4), . . . , 302(N) along a lateral direction 303 according to some implementations. Individual ones of the elements 302 may have M bias controllable regions to which may be applied M different bias voltages. Therefore, one of the two electrodes of each element 302 may have M sub-electrodes. In the illustrated example, suppose that M=5 and that one or more of the elements 302 corresponds to the element 200 of FIG. 2. Thus, the element 302 may include the sub-electrodes 204, 205, 206, 207, and 208, which may have bias voltages independently applied for creating separate bias controllable regions 234, 235, 236, 237, and 238, respectively.

FIG. 3B illustrates an example simplified equivalent circuit of the array 300 in which each element is presented as a variable capacitor according to some implementations. In this example, each element 302(1)-302(N) has multiple sub-electrodes (e.g., 204, 205, 206, 207, and 208) corresponding to multiple independently bias controllable regions 234, 235, 236, 237, and 238, respectively. In the illustrated example, all the sub-electrodes in the same region along the elevation direction of all the elements in the array may be connected to the same bias voltage. For example, all sub-electrodes 206 of all elements 302(1)-302(N) may be connected to the bias voltage $V_{bias1}$ 304; all sub-electrodes 205 of all elements 302(1)-302(N) may be connected to the bias voltage $V_{bias2}$ 306; all sub-electrodes 207 of all elements 302(1)-302(N) may be connected to the bias voltage $V_{bias3}$ 308; all sub-electrodes 204 of all elements 302(1)-302(N) may be connected to the bias voltage $V_{bias4}$ 310; and all sub-electrodes 208 of all elements 302(1)-302(N) may be connected to the bias voltage $V_{bias5}$ 312. Therefore, in some cases, the bias voltages in the same respective regions in the respective elements 302(1)-302(N) may be the same in the array 300 so that the aperture or/and apodization of all elements 302(1)-302(N) in the array may be the same (and assuming the structure of the elements 302(1)-302(N) is the same).

In the examples of FIGS. 2 and 3A-3B, each sub-electrode 204-208 may correspond to a separate bias controllable region 234-238, respectively, of the respective CMUT element. Thus, as illustrated in FIG. 3A, each element 302(1), 302(2), 302(3), . . . , 302(N) may include a plurality of respective bias controllable regions in the elevation direction 203. In this example, element 302(1) includes five bias controllable regions 234, 235, 236, 237, and 238 that correspond to the plurality of sub-electrodes 204, 205, 206, 207, and 208, respectively, and that may be operable separately based on the separate operability of the respective sub-electrodes. The separate bias controllable regions 234, 235, 236, 237, and 238 may have the same or different CMUT cells. If different CMUT cells are used for some of the different regions 234-238, then, as one example, the center frequency of the CMUT cells in the region 236 closer to the center may have a higher center frequency that the CMUT cells in the regions closer to the edges, e.g., regions 234 and 238; and the sensitivity of the CMUT cells in the region 236 closer to the center may be higher than the sensitivity of the CMUT cells in the regions 234 and 238 closer to the edges.

Figure 3C:
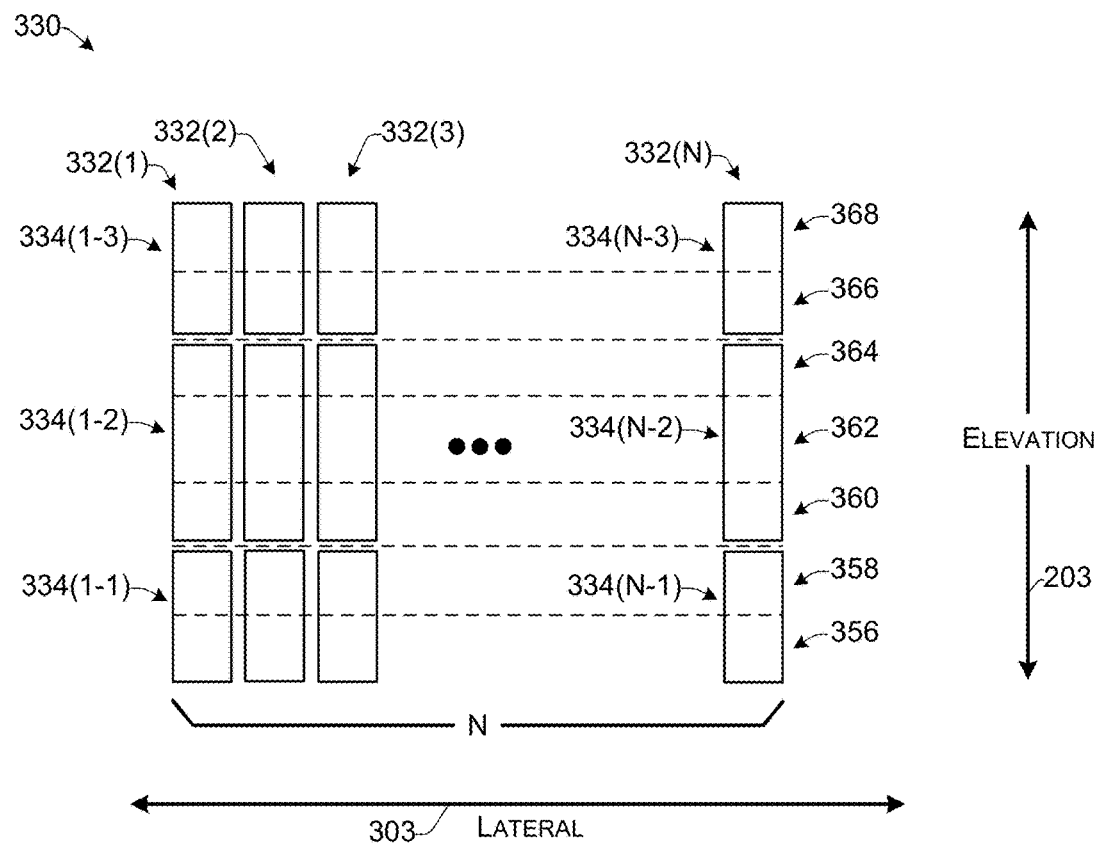
Figure 3D:
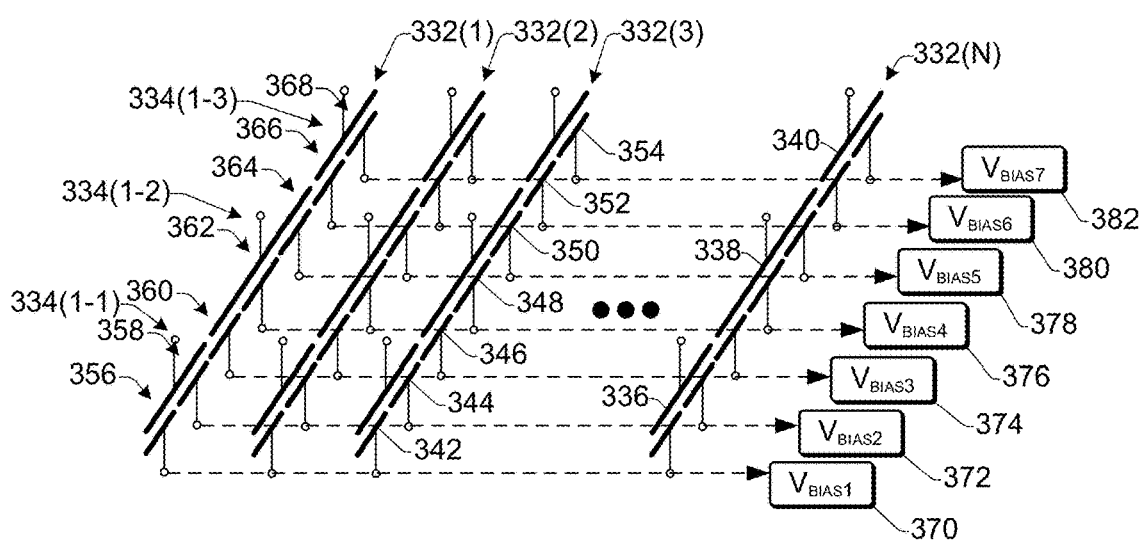

FIGS. 3C-3D illustrate an example CMUT array 330 according to some implementations. FIG. 3C illustrates an example of a 1.25D/1.5D/1.75D CMUT array 330 having N CMUT elements 332(1), 332(2), 332(3), . . . , 332(N) along a lateral direction 303 according to some implementations. Individual ones of the elements 332 may have J sub-elements 334 to which may be applied J different TX/RX signals. Further, the elements 332 may include M bias controllable regions to which may be applied M different bias voltages. Therefore, a first one of the two electrodes of each element 332 (e.g., the top electrode in the illustrated example) may have J sub-electrodes to form J sub-elements 334 and a second one of the two electrodes of each element 332 (e.g., the bottom electrode in the illustrated example) may have M sub-electrodes to form M separate bias controllable regions.

As illustrated in FIG. 3B, each element 332 may include sub-electrodes 336, 338, and 340, which may have a TX/RX signal independently applied as a plurality of separate sub-elements 334(K-J), where K is an integer from 1 to N, and where N is the number of elements 332 in the array 330. In the illustrated example, suppose that J=3. Accordingly, each element 332 includes three sub-elements, e.g., element 332(1) includes sub-elements 334(1-1), 334(1-2) and 334(1-3), element 332(N) includes sub-elements 334(1-N), 334(2-N) and 334(3-N), etc.

Furthermore, in the illustrated example, suppose that M=7, i.e., there are 7 bias controllable regions. To provide the seven bias controllable regions, each element 332 may include seven sub-electrodes 342, 344, 346, 348, 350, 352, 354. The respective sub-electrodes 342, 344, 346, 348, 350, 352, 354 in each element 332 may have separate bias voltages independently applied for creating separate bias controllable regions 356, 358, 360, 362, 364, 366, 368, respectively. Consequently, in this example, the sub-elements 334(1-1) through 334(N-1) (corresponding to the sub-electrodes 336) may have two separate bias controllable regions 356 and 358, corresponding to the sub-electrodes 342 and 344, respectively. The sub-elements 334(1-2) through 334(N-2) (corresponding to the sub-electrodes 338) may have three separate bias controllable regions 360, 362 and 364, corresponding to the sub-electrodes 346, 348, and 350, respectively. The sub-elements 334(1-3) through 334(N-3) (corresponding to the sub-electrodes 340) may have two separate regions 366 and 368, corresponding to the sub-electrodes 352 and 354, respectively. Moreover, the sub-electrodes of each element 332 may be arranged symmetrically from the center of the element 332 in the elevation direction 203.

FIG. 3D illustrates an example simplified equivalent circuit of the array 330 in which each element 332 is presented as a variable capacitor according to some implementations. In this example, the first electrode of each element 332(1)-332(N) (e.g., the top electrode in this example) has multiple sub-electrodes (e.g., 336, 338 and 340) corresponding to multiple sub-elements 334. Each sub-element 334 may correspond to different RX/TX signals. The second electrode of each element 332(1)-332(N) (e.g., the bottom electrode in this example) has multiple sub-electrodes (e.g., 342, 344, 346, 348, 350, 352, 354) corresponding to multiple independently bias controllable regions 356, 358, 360, 362, 364, 366, 368, respectively.

In the illustrated example, all the sub-electrodes of the second (bottom) electrode in the same respective region 356, 358, 360, 362, 364, 366, 368 along the elevation direction of all the elements 332(1)-332(N) in the array 330 may be connected to the same bias voltage. For example, all sub-electrodes 342 of all elements 332(1)-332(N) may be connected to a bias voltage $V_{bias1}$ 370; all sub-electrodes 344 of all elements 332(1)-332(N) may be connected to a bias voltage $V_{bias2}$ 372; all sub-electrodes 346 of all elements 332(1)-332(N) may be connected to a bias voltage $V_{bias3}$ 374; all sub-electrodes 348 of all elements 332(1)-332(N) may be connected to a bias voltage $V_{bias4}$ 376; all sub-electrodes 350 of all elements 332(1)-332(N) may be connected to a bias voltage $V_{bias5}$ 378; all sub-electrodes 352 of all elements 332(1)-332(N) may be connected to a bias voltage $V_{bias6}$ 380; and all sub-electrodes 354 of all elements 332(1)-332(N) may be connected to the bias voltage $V_{bias7}$ 382. Therefore the bias voltages in different regions 356, 358, 360, 362, 364, 366, 368 in all elements 332(1)-332(N) may be the same in the array 330 so that the aperture or/and apodization of all elements 332(1)-332(N) in the array 330 are may be the same (and assuming the structure of the elements 332(1)-332(N) is the same).

The separate sub-elements and/or separate bias controllable regions may have the same or different CMUT cell configurations. If different CMUT cell configurations are used for the different sub-elements or bias controllable regions, then, as one example, the center frequency of the CMUT cells in the sub-electrode or bias controllable region closer to the center in the elevation direction 203 may be higher than the center frequency of the CMUT cells in the sub-electrodes or bias controllable regions closer to the edges; and the sensitivity of the CMUT cells in the sub-electrode or bias controllable region closer to the center may be higher than the sensitivity of the CMUT cells in the sub-electrode or bias controllable regions closer to the edges.

In addition, in other examples, the CMUT cell properties, including physical properties (e.g., membrane area, thickness, and shape), and the CMUT performance parameters (e.g., frequency and sensitivity) at the different sub-electrodes may be different from sub-element to sub-element or from independently bias controllable regions to independently bias controllable regions in the same element 332 along the elevation direction 203. Alternatively, of course, in some examples, the elements, sub-elements, and/or independently bias controllable regions may all have the same physical configuration. As one example in FIG. 3, the properties of the CMUT cells in the same region 356, 358, 360, 362, 364, 366, 368, respectively, with the same sub-electrodes 342, 344, 346, 348, 350, 352, 354, respectively, shared by many elements (or sub-elements) may be the same.

In addition, elements and/or sub-elements in the arrays 300 and/or 330 may share the same set of sub-electrodes. For instance, in the example of FIG. 3B, elements 302(1), 302(2), 302(3), ... 302(N) share the same sub-electrode sets of 204, 205, 206, 207, and 208, which are connected to respective bias voltages 310, 306, 304, 308, and 312, and which correspond to the regions 234, 235, 236, 237, and 238. Additionally, in the example of FIG. 3D, each sub-element 334 may each include its own sub-electrode 336, 338 or 340 as a first (e.g., upper) electrode, and may include multiple sub-electrodes (e.g., 342, 344, 346, 348, 350, 352, 354) as a second (e.g., bottom) electrode. In some examples, the performance of the respective regions in sub-elements and elements may be controlled by applying different bias voltages to the respective different sub-electrodes of the different sub-elements and/or elements. For example, the performance parameters (e.g., frequency and sensitivity) may be controlled by controlling the bias voltages applied to the respective regions using the different sub-electrodes. Further, in some cases, an element or sub-element in a CMUT array may be individually addressed by an individual system TX/RX channel.

In addition, in some examples, the bias controllable regions with different bias voltages in an element 302 or 332 may be arranged symmetrically in relation to the center of the element 302 or 332. For the example in FIGS. 3A-3B, the sub-electrodes 204 and 208 may be connected to the same bias voltage and the sub-electrodes 205 and 207 may be connected to another same bias voltage, or, in other words, $V_{bias4}$ 310 may equal $V_{bias5}$ 312; $V_{bias2}$ 306 may equal $V_{bias3}$ 308; and $V_{bias1}$ 304 may be different. However, in other examples, different bias voltages may be applied to some or all of the bias controllable regions 234-238.

Similarly, in the example of FIGS. 3C-3D, in some cases, $V_{bias1}$ 370 may equal $V_{bias7}$ 382; $V_{bias2}$ 372 may equal $V_{bias6}$ 380; $V_{bias3}$ 374 may equal $V_{bias5}$ 378, and $V_{bias4}$ 376 may be different. However, in other examples, different bias voltages may be applied to some or all of the bias controllable regions 356-368.

Moreover, in order to simplify the CMUT interconnection with the outside (e.g., either flexible printed circuit board (PCB) or rigid PCB), at least some of the sub-electrodes of the different elements in the same region may be connected together. For example, the sub-electrodes 204 of all elements 302(1)-302(N) may be connected together in on a PCB substrate. Other sub-electrodes in the same bias controllable region may be similarly connected together across the elements in an array.

In some examples, one CMUT element may correspond to one individually addressed channel for TX and/or RX in an ultrasound imaging system. For instance, all sub-electrodes of one electrode in the CMUT element may be connected to the same channel of the system and, for example, may share the same signal related to TX and RX. In the illustrated example of FIGS. 3A-3B, each CMUT element 302(1)-302(N) in the CMUT 300 array may connect to one channel of a system (TX/RX) so that the individual element is able to be independently addressed by the system. One of the two electrodes (e.g., first electrode 202 or second electrode 209) may connect to a channel of the system, while the other may connect to ground or a bias.

As another example, the CMUT array 300 of FIGS. 3A-3B with N elements 302 may have elements 302 that include three regions able to have different bias voltages applied. For instance, at least one of two electrodes of each element 302 in the CMUT array 300 may have three sub-electrodes in the elevation dimension 203, rather than five (i.e., M=3). This configuration may include a central bias controllable region 236 corresponding to the sub-electrode 206 and two outer bias controllable regions 235 and 237 corresponding to the sub-electrodes 205 and 207 on either side of the center region 236. The regions 234 and 238 corresponding to the sub-electrodes 204 and 208 are not included in the element 302. The two outer sub-electrodes 205 and 207 may be electrically connected together. For the CMUT array 300, all the sub-electrodes in the same region 235, 236, or 237 of each element can share one bias supply 200.

In addition, in the example of FIGS. 3C-3D, each sub-element 334, of each element may correspond to an individually addressed channel for TX and/or RX in an ultrasound imaging system. For instance, the first sub-element 334(1-1) of element 332(1) may correspond to a first TX/RX channel; the second sub-element 334(1-2) may correspond to a second TX/RX channel; and the third sub-element 334(1-3) may correspond to a third TX/RX channel. Numerous other variations will be apparent to those of skill in the art having the benefit of the disclosure herein.

In some examples, the aperture of the CMUT elements 302 and/or 332, and thereby the CMUT array 300 and/or 330 may be controlled to change dynamically. Thus, an effective aperture size may be made larger in the elevation direction by applying different bias voltages to different pairs of the bias controllable regions in the array 300 and/or 330 to transmit and/or receive ultrasonic energy as traveling time or depth increases in real-time during a receive phase.

The dynamic elevation aperture growth allows the imaging system to maintain a high image quality throughout display depth from near field to far field. Having a larger aperture size may enable imaging at greater depths in a medium. The ratio of the imaging depth to the aperture size is known as the F-number. In addition, the bias voltages applied to the bias controllable regions may be controlled so that the elevation aperture grows at a constant rate or the F-number remains a constant. Alternatively, the elevation aperture may be increased at a constant percentage rate.

Operating frequencies may also be closely controlled in medical ultrasound imaging applications. On one hand, it is desirable to have higher operating frequencies because this can produce better imaging resolution; other the other hand, it may be more desirable to use lower operating frequencies to obtain deeper penetration of the ultrasonic energy. Some examples herein address these conflicting goals by applying different bias voltages to different bias controllable regions and changing the bias voltages over time. Since near-field imaging may employ a small elevation aperture, it may be desirable initially to apply a higher bias voltage to a center bias controllable regions to have a higher center frequency since the center bias controllable regions has higher resonant frequency. As the imaging depth increases, however, a larger elevation aperture and a lower center frequency may be employed. Therefore, in some implementations herein, the bias voltages applied to edge bias controllable regions may increase with the passage of time.

In some implementations herein using FIGS. 3A-3B as an example, the center frequency of respective bias controllable regions 234-238 corresponding to the sub-electrodes 204-208 may be different from the center frequency of other respective bias controllable regions 234-238. For instance, the center frequency of the bias controllable region closer to a center in the elevation direction 203 of the CMUT array 300 may be higher than the center frequency of the bias controllable regions closer to the upper edge and lower edge of the CMUT array 300. For example, the center frequency of the central bias controllable regions 236 may be higher than that of the bias controllable regions 235 and 237. Further, the center frequency of bias controllable regions 235 and 237 may be higher than that of bias controllable regions 234 and 238, respectively, and so forth.

Figure 4:
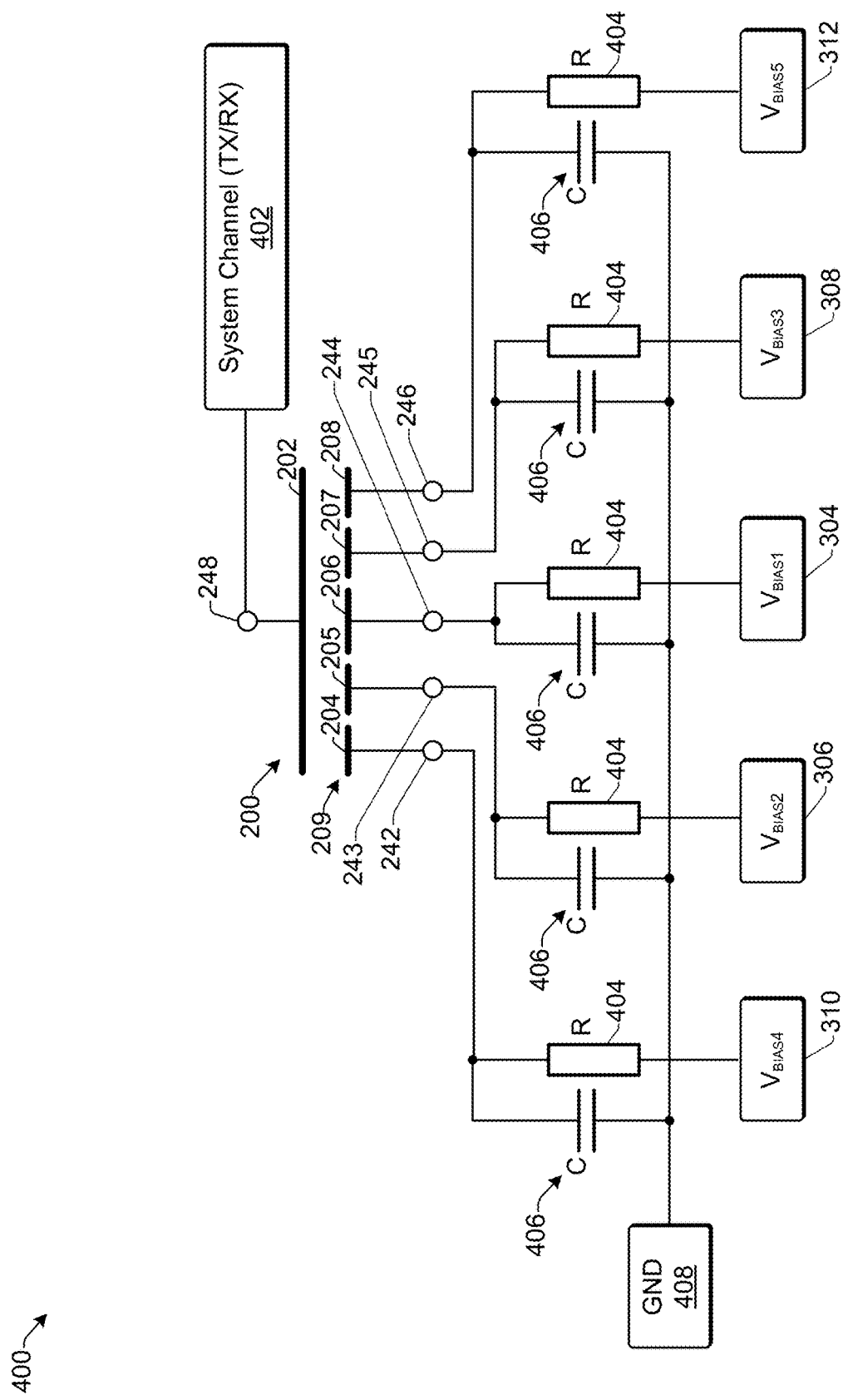
FIG. 4 illustrates an example circuit for system connection of a CMUT element according to some implementations.

FIG. 4 illustrates an example circuit 400 for system connection of a CMUT element 200 (and/or 302) according to some implementations. In this example, the first electrode 202 without sub-electrodes connects to a system channel 402. The sub-electrodes 204, 205, 206, 207, 208 of the second electrode 209 connect to the bias voltages $V_{bias4}$ 310, $V_{bias2}$ 306, $V_{bias1}$ 304, $V_{bias3}$ 308, and $V_{bias5}$ 312, respectively. In some examples, a resistor R 404 and capacitor C 406 are used for each sub-electrode. The resistor R 404 is optional in this configuration, and thus, may be omitted in some examples. The resistor R 404 and capacitor 406 may serve at least two functions: (1) protect the CMUT from potential large current from the bias voltage, and (2) reduce noise from the bias voltage supplies. As one example, the resistors R 404 may be connected between the CMUTs and the bias voltage, and the capacitors C 406 may be connected between the CMUT and a ground (GND) 408. Alternatively, the capacitors C 406 may be connected between the CMUT electrode and the bias voltage supplies 204-208. The CMUT elements 332 of the array 330 may be similarly controlled, but with a separate system channel 402 corresponding to each separate sub-element 334, as mentioned above.

Figure 5:
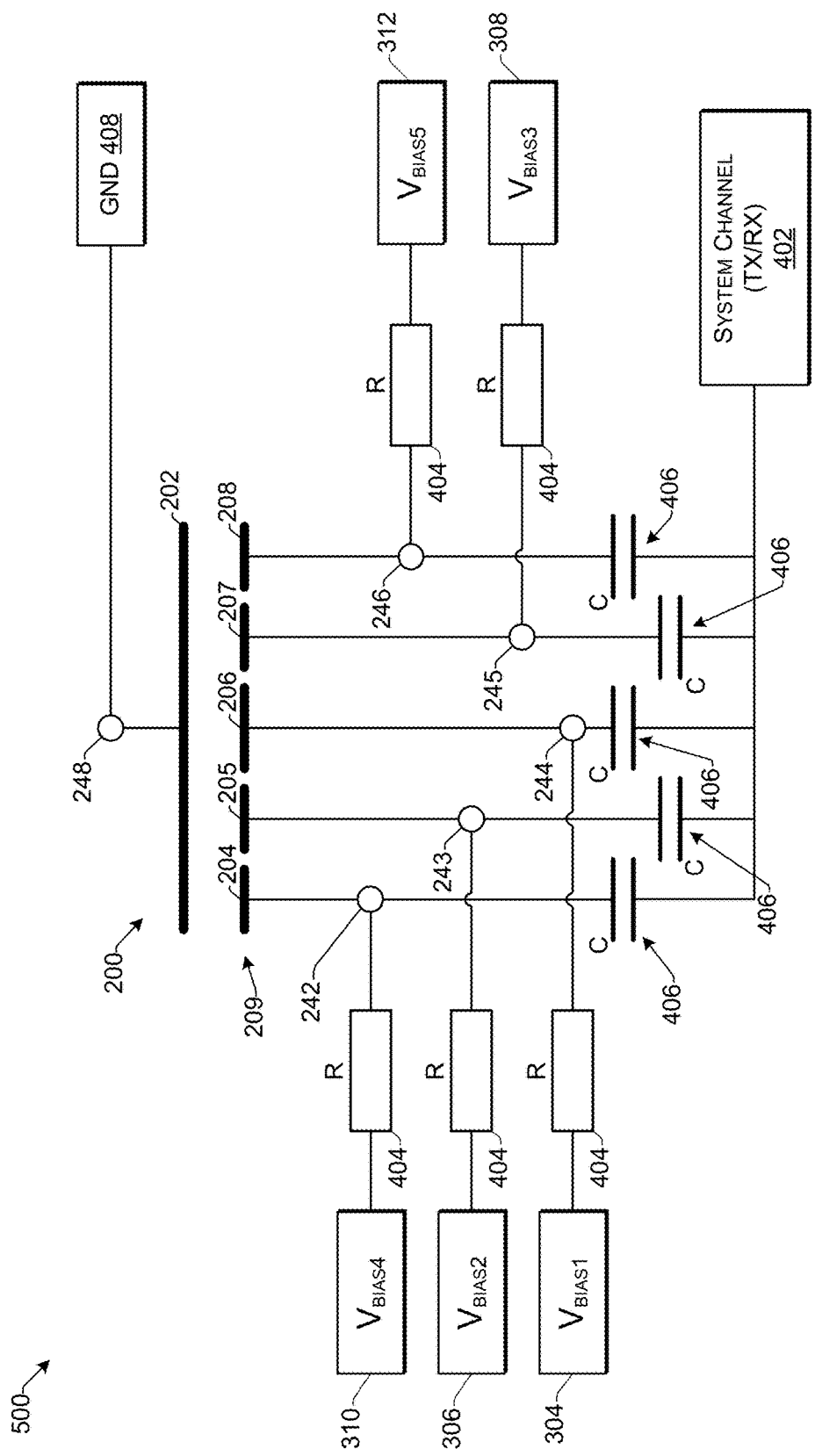
FIG. 5 illustrates an example circuit for system connection of a CMUT element according to some implementations.

FIG. 5 illustrates an example circuit 500 for system connection of a CMUT element 200 (and/or 302) according to some implementations. In FIG. 5, the first electrode 202 without sub-electrodes connects to the ground (GND) 408 in the system. The sub-electrodes 204, 205, 206, 207, 208 of the second electrode 209 connect to one channel of the system channel 402 (TX/RX) and to the bias voltage supplies $V_{bias4}$ 310, $V_{bias2}$ 306, $V_{bias1}$ 304, $V_{bias3}$ 308, and $V_{bias5}$ 312, respectively. In this case, a bias circuit, including a respective resistor R 404 and respective capacitor C 406 may be used for each sub-electrode 204-208. In this example, the resistor R 404 may be connected between the CMUT 200 and the bias voltage supplies $V_{bias4}$ 310, $V_{bias2}$ 306, $V_{bias1}$ 304, $V_{bias3}$ 308, and $V_{bias5}$ 312. The capacitor C 406 may be connected between the CMUT and the system channel 408. The CMUT elements 332 of the array 330 may be similarly controlled, but with a separate system channel 402 corresponding to each separate sub-element 334, as mentioned above.

Figure 6:
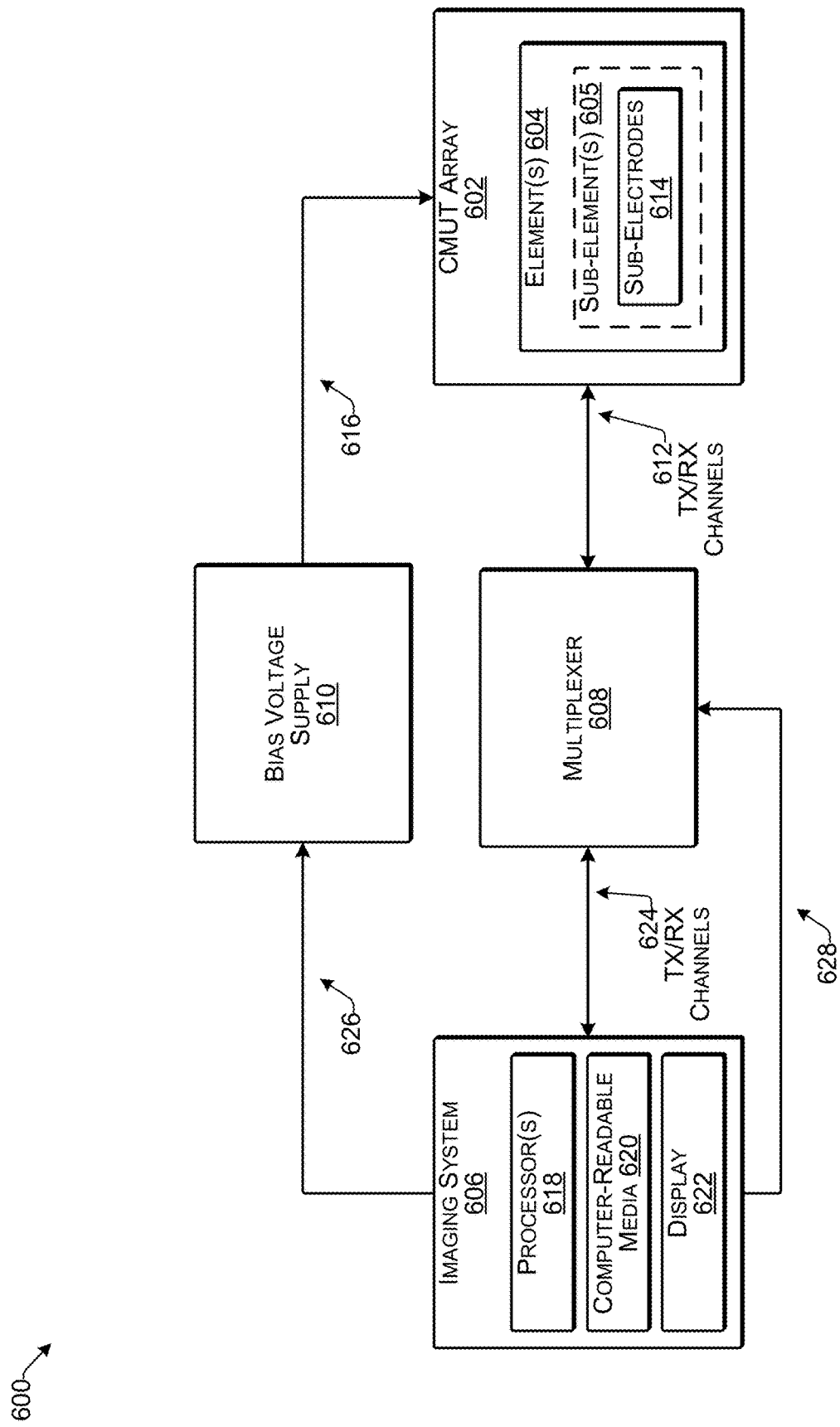
FIG. 6 is a block diagram illustrating an example configuration of an ultrasound system including one or more CMUTS according to some implementations.

FIG. 6 is a block diagram illustrating an example configuration of an ultrasound system 600 including one or more CMUTS according to some implementations. In this example, the system 600 includes a CMUT array 602. In some cases, the CMUT array 602 may correspond to the CMUT array 300 or 330 discussed above with respect to FIGS. 3A-3D, and may include one or more CMUT elements 604. In some examples, the CMUT elements 604 may correspond to the CMUT elements 200 and/or 302 discussed above. Alternatively, in some examples, the elements 604 may correspond to the CMUT elements 332 discussed above, and may in that case include multiple sub-elements 605. The system 600 further includes an imaging system 606, a multiplexer 608, and a bias voltage supply 610 in control of the CMUT array 602. As one non-limiting example, the system 600 may include, or may be included in, an ultrasound probe for performing ultrasound imaging.

Further, the system 600 may include multiple transmit and receive (TX/RX) channels 612. In addition, the CMUT array 602 may include N×M sub-electrodes 614, e.g., where N is the number of elements, and M is the number of bias controllable regions for each element 604 along the elevation dimension. In some examples, each bias controllable region may correspond to a sub-electrode 614, e.g., as discussed above with respect to FIGS. 2-5. For instance, the CMUT array 602 may include 128 (e.g., N) transmit and receive channels 612 that communicate with the multiplexor 608. In some examples, the properties of at least some of the bias controllable regions may vary or may be varied by varying the bias voltage supplied to individual ones of the sub-electrodes 614. Further, in some cases, the physical configurations of the CMUT cells within the bias controllable regions may vary, which may also vary the transmit and receive properties of the bias controllable regions.

In addition, the bias voltage supply 610 may generate bias voltages to apply various bias voltages to selected sub-electrodes 614 of the bias controllable regions, as indicated at 616. Further, in some examples, the bias voltage generated for some or all of the bias controllable regions may be time-dependent, and may change over time.

The imaging system 606 may include one or more processors 618, one or more computer-readable media 620, and a display 622. For example, the processor(s) 618 may be implemented as one or more physical microprocessors, microcontrollers, digital signal processors, logic circuits, and/or other devices that manipulate signals based on operational instructions. The computer-readable medium 620 may be a tangible non-transitory computer storage medium and may include volatile and nonvolatile memory, computer storage devices, and/or removable and non-removable media implemented in any type of technology for storage of information such as signals received from the CMUT array 602 and/or processor-executable instructions, data structures, program modules, or other data. Further, when mentioned herein, non-transitory computer-readable media exclude media such as energy, carrier signals, electromagnetic waves, and signals per se.

In some examples, the imaging system 606 may include, or may be connectable to the display 622 and/or various other input and/or output (I/O) components such as for visualizing the signals received by the CMUT array 602. In addition, the imaging system 606 may communicate with the multiplexer 608 through a plurality of TX/RX channels 624. Furthermore, the imaging system 606 may communicate directly with the multiplexer 608, such as for controlling a plurality of switches therein, as indicated at 628, in addition to communicating with the bias voltage supply 610, as indicated at 626.

The multiplexer 608 may include a large number of high voltage switches and/or other multiplexing components. As one example, 128 TX/RX channels 624, 256 TX/RX channels 612, 256 elements 604, and 5 bias controllable regions corresponding to 5 sub-electrodes 614 for each element 604 may be employed in some examples herein, although the implementations herein may be used for any number of channels 624, any number of channels 612, any number of elements 604, and any number of sub-electrodes 614. As one example, the system 600 may have H TX/RX channels 624, N TX/RX channels 612, the CMUT array can have M×N bias controllable regions, where N and H are positive integers, and M is a positive odd integer.

Further, through use of the multiplexor 608, the system 600 may use H×M bias controllable regions to generate desired images based on imaging requirements, such as lateral resolution, elevation resolution, penetration depth, and field of view. The system 600 may also be used to select different apodization profiles in the elevation dimension using different timings for applying monotonically increasing bias voltages to improve imaging performance, such as discussed additionally below with respect to FIGS. 13 and 14.

Figure 7:
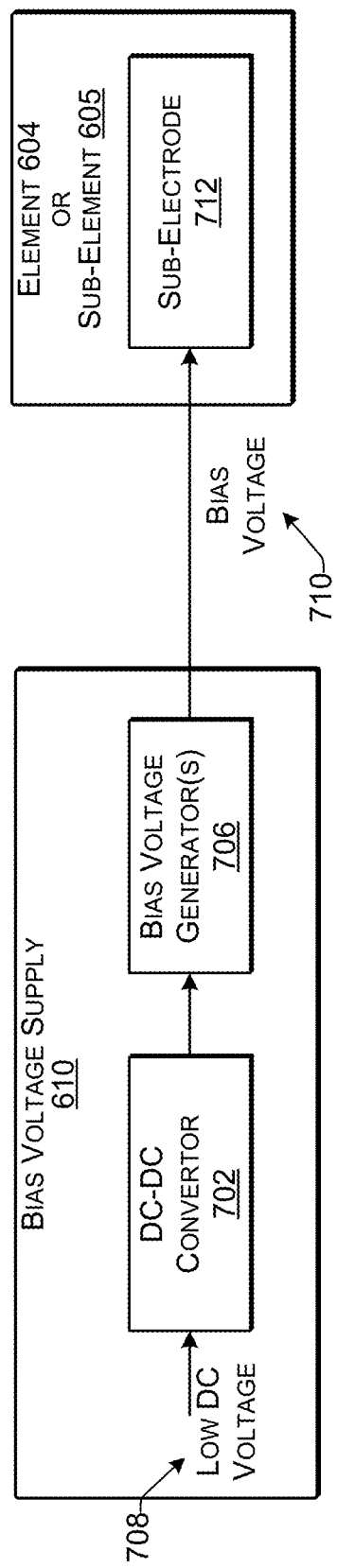
FIG. 7 is a block diagram illustrating an example of select components of bias voltage supply according to some implementations.

FIG. 7 is a block diagram illustrating an example of select components of bias voltage supply 610 according to some implementations. The bias voltage supply 610 may include a DC-to-DC converter 702 and one or more bias generators 706. The DC-to-DC converter 702 of the bias voltage supply 610 may convert a low DC voltage 708 (e.g., 5V, 10V, etc.), into a high DC voltage such as 200V, 400V, etc. In some examples, the bias generator 706 may generate a monotonically increasing bias voltage 710 to a sub-electrode 712 of a selected element 604 and/or sub-element 605, such as after receiving a start signal. For example, the bias voltage 710 may increase over time as discussed additionally below. Furthermore, in some examples, the bias generator 706 may reduce the level of the bias voltage 710 to an initial voltage, e.g., 0V relatively quickly after receiving an end signal or at a predetermined time. The bias generator 706 may be implemented using at least one of analog or digital techniques.

Figure 8:
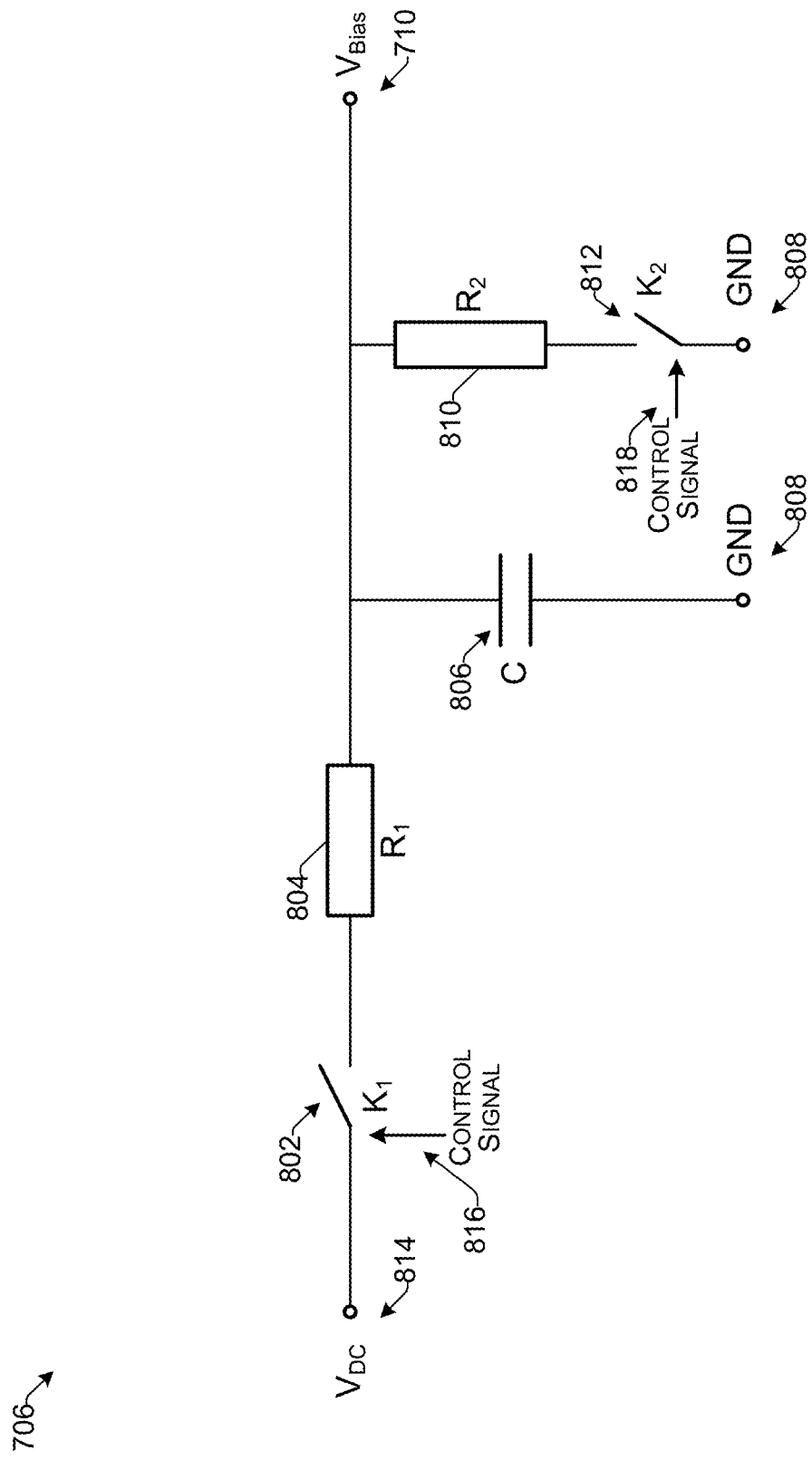
FIG. 8 illustrates an example of a bias voltage generator according to some implementations.

FIG. 8 illustrates an example of a bias voltage generator 706 according to some implementations. The bias voltage generator 706 in this example may be an analog bias voltage generator, and includes a first switch $K_1$ 802, a first resistor $R_1$ 804, a capacitor C 806 connected to ground 808, and a second resistor $R_2$ 810 connectable to ground 808 by a second switch $K_2$ 812. When the first switch $K_1$ 802 is closed, a voltage $V_{DC}$ 814 provided to the bias voltage generator 706 starts to charge the capacitor C 806 and the bias voltage $V_{bias}$ 710 increases exponentially at rate $(1-e^{-t/\tau})$, where $\tau=R_1C$ is a time constant. After the ultrasound signal reaches a predetermined depth, switch the first $K_1$ 802 may be opened and the second switch $K_2$ 812 may be closed. This causes the bias voltage $V_{bias}$ 710 drops to 0V quickly as the capacitor C 806 discharges through resistor $R_2$ 810. In some cases, the second resistor $R_2$ 810 may have a significantly smaller resistance than the first resistor $R_1$ 804. Furthermore, control signals 816 and 818, respectively, that turn on and off the first switch $K_1$ 802 and the second switch $K_2$ 812 may be generated by the processor of the imaging system discussed above with respect to FIG. 6, or by a separate timing apparatus inside the system. The timing apparatus may be analog or digital.

Figure 9:
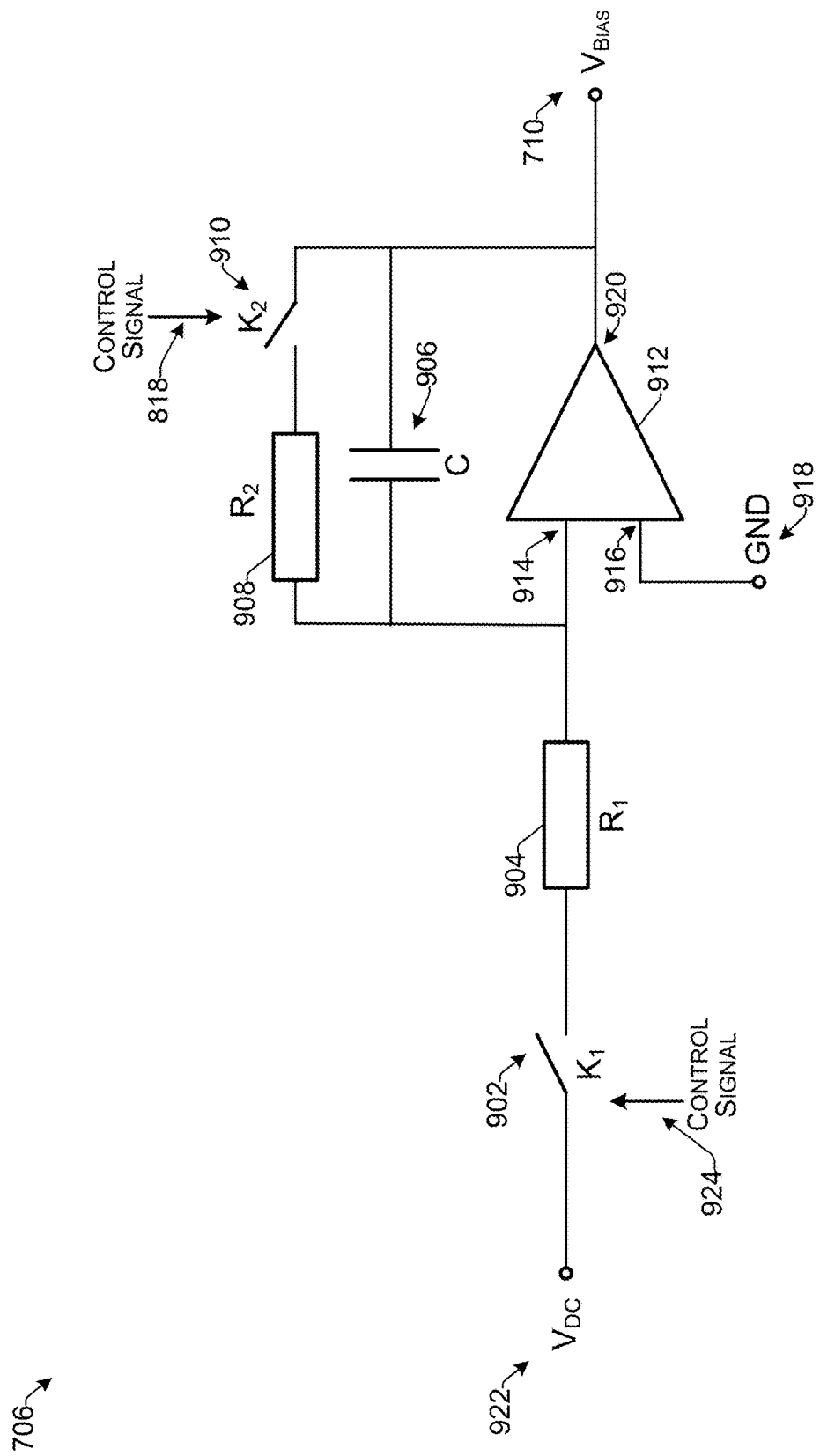
FIG. 9 illustrates an example of a bias voltage generator according to some implementations.

FIG. 9 illustrates an example of a bias voltage generator 706 according to some implementations. The bias voltage generator 706 in this example may be an analog bias voltage generator, and includes a first switch $K_1$ 902, a first resistor $R_1$ 904, a capacitor C 906, and a second resistor $R_2$ 908 connectable in parallel with the capacitor C 906 by a second switch $K_2$ 910. In addition, the bias voltage generator 706 includes an amplifier 912 having a first connection 914, a second connection 916 connected to ground 918, and a third connection 920. A voltage $V_{DC}$ 922 may be provided to the bias voltage generator 706. The amplifier 912 creates an integration circuit such that when the first switch $K_1$ 902 is closed, the bias voltage $V_{bias}$ 710 starts to increase linearly at rate $t/\tau$, where $\tau=R_1C$ is a time constant. After the ultrasound signal reaches a predetermined depth, the first switch $K_1$ 902 may be opened and the second switch $K_2$ 910 may be closed, which causes the $V_{bias}$ 710 to drop quickly to 0V as the capacitor C 906 discharges through the second resistor $R_2$ 908. In some cases, the second resistor $R_2$ 908 may have a significantly smaller resistance than the first resistor $R_1$ 904. Furthermore, control signals 924 and 926, respectively, may turn on and off the first switch K1 902 and the second switch K2 910, and may be generated by the processor 618 of the imaging system 606 discussed above with respect to FIG. 6, or by a separate timing apparatus inside the system. The timing apparatus may be analog or digital.

Although two analog examples of the bias voltage generator 706 are presented here, similar principles may be extended to other analog circuits able to generate monotonically increasing voltage outputs, as will be apparent to those of skill in the art having the benefit of the disclosure herein. Further, in some examples, as mentioned above, a digital version of the bias voltage generator 706 may be employed.

Figure 10:
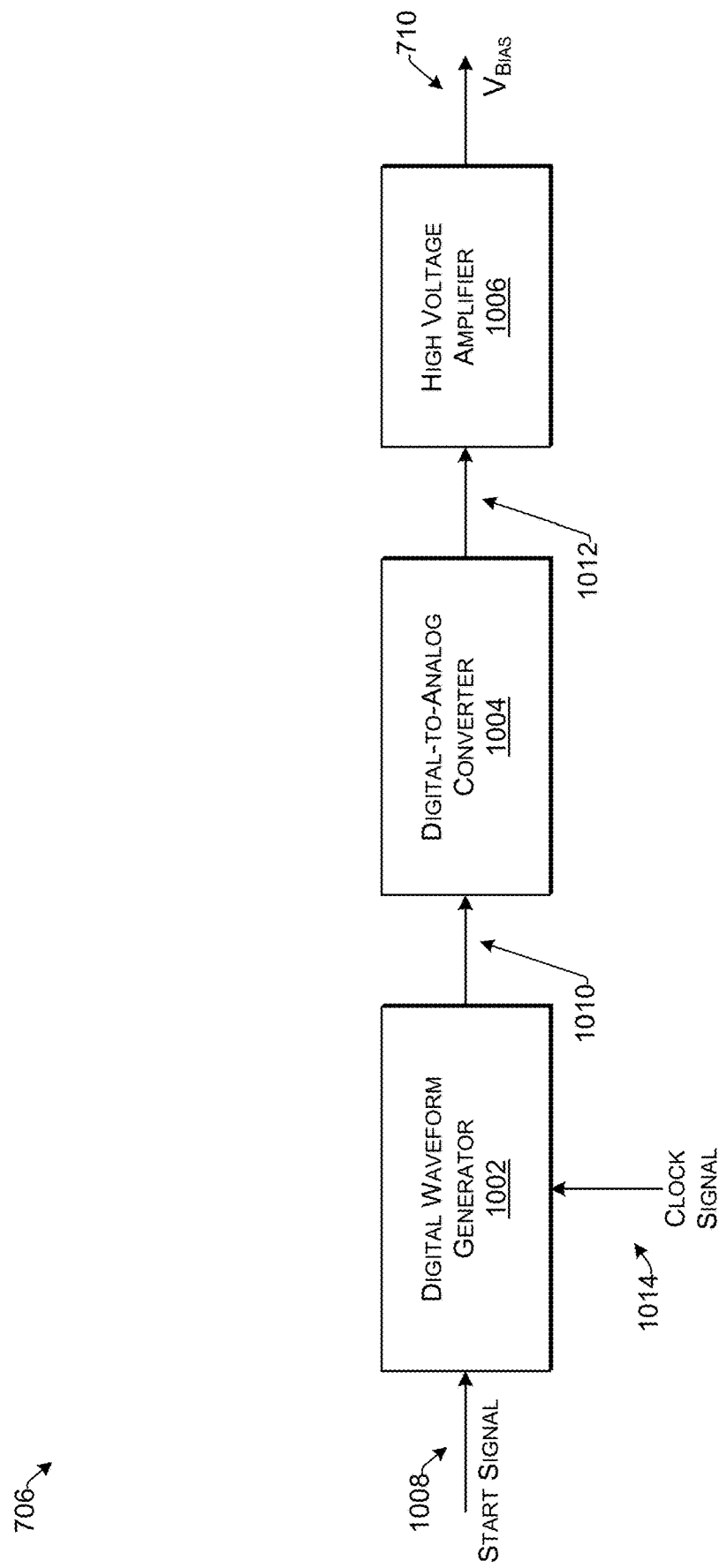
FIG. 10 illustrates an example of a bias voltage generator according to some implementations.

FIG. 10 illustrates an example of a bias voltage generator 706 according to some implementations. In this example, the bias voltage generator 706 may be a digital bias voltage generator, and may include a digital waveform generator 1002, a digital-to-analog converter 1004, and a high-voltage amplifier 1006. The digital waveform generator 1002 receives a start signal 1008 and begins outputting a monotonically increasing digital waveform at 1010. The digital-to-analog convertor 1004 converts the digital waveform 1010 into an analog voltage signal 1012. Subsequently, the high voltage amplifier 1006 scales the analog voltage signal 1012 to a desired bias level to generate the bias voltage 710. After the ultrasound signal reaches a predetermined depth, a stop signal may be sent to the digital waveform generator 1002, which causes the $V_{bias}$ 710 to drop to 0V. A clock signal 1014 to control the digital waveform generator 1002 may be generated by the processor 618 of the imaging system 606 discussed above with respect to FIG. 6, or by a separate timing apparatus inside the system. The timing apparatus may be analog or digital.

Figure 11:
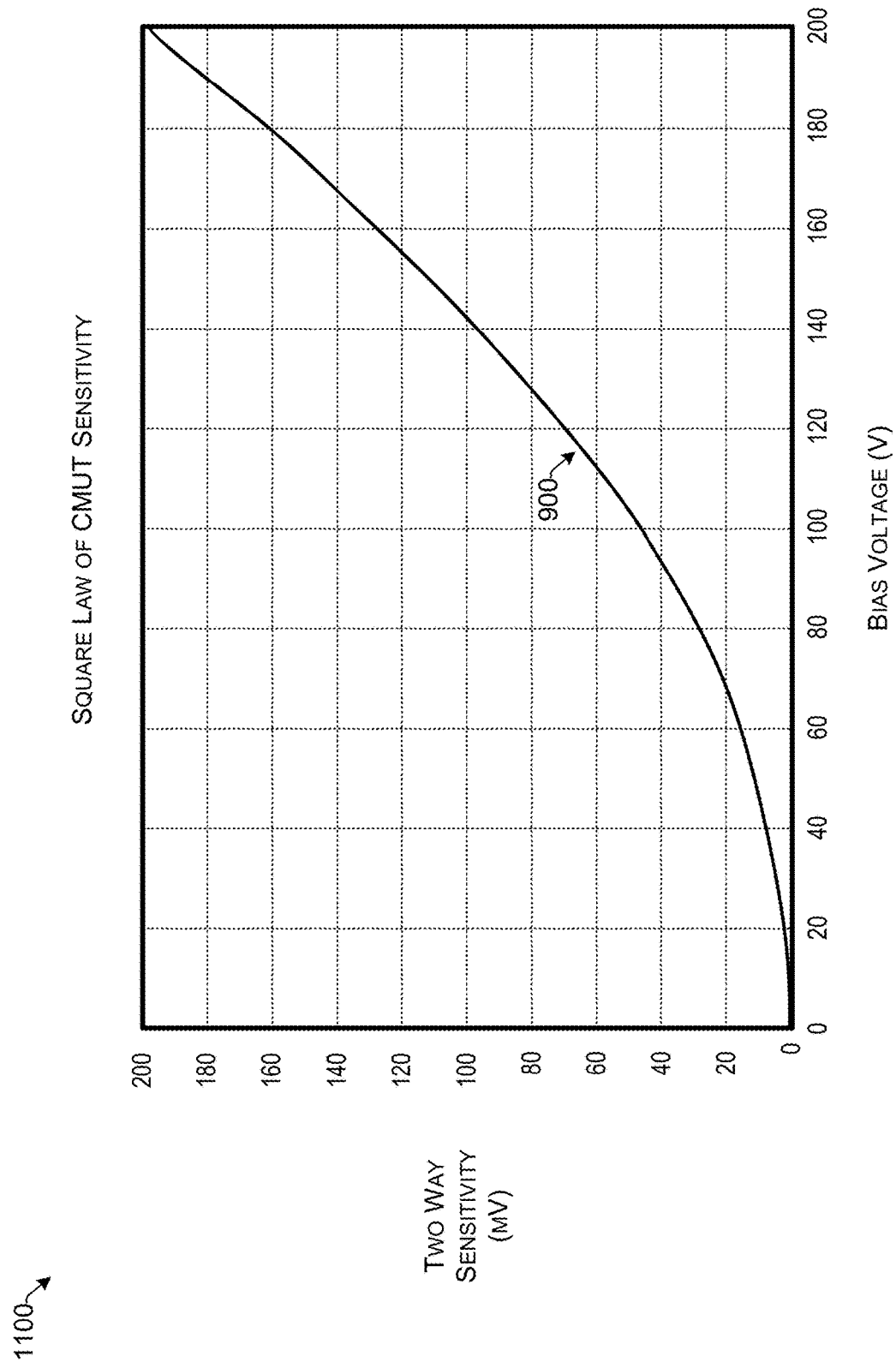
FIG. 11 illustrates an example graph showing a plot of CMUT sensitivity vs. bias voltage according to some implementations.

FIG. 11 illustrates an example graph showing a plot of CMUT sensitivity vs. bias voltage according to some examples. In this example, the sensitivity of a CMUT is shown to increase with the bias level governed by a so-called square law. For instance, the sensitivity of a CMUT bias controllable region may be controlled by varying the level of bias voltage applied to the CMUT bias controllable region. When the bias voltage is 0 or very low, the sensitivity in millivolts (mV) is also very low. As the bias voltage increases, the sensitivity also increases quickly. As one example, if the bias voltage is doubled, the sensitivity in mV may be tripled or quadrupled. For instance, the sensitivity is about 17 mV when the bias voltage is 60V, and the sensitivity is increased to about 72 mV when the bias voltage is doubled to be 120 V, an increase of threefold. Therefore, the effective elevation aperture of a CMUT array can increase with time if the bias voltages applied to the outer bias controllable regions of the array (e.g., closer to the edges) increase with time.

Figure 12A:
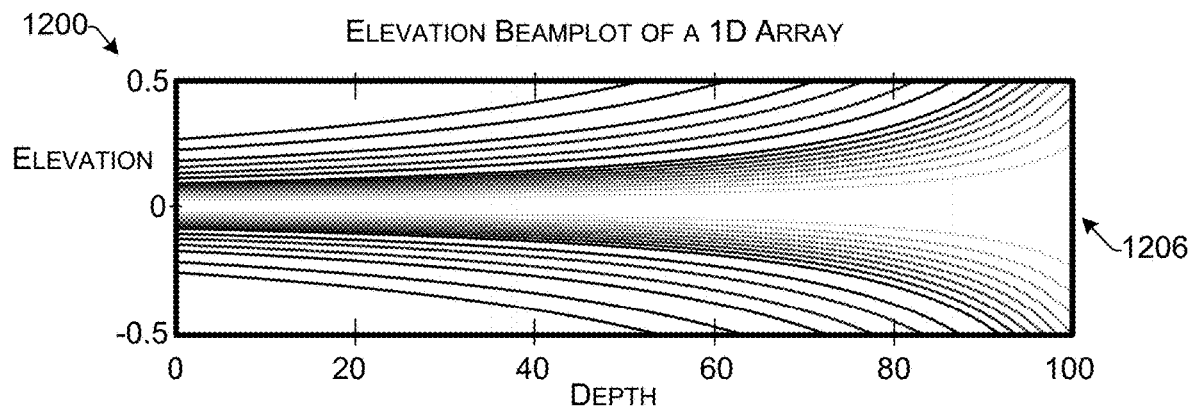
FIGS. 12A-12C illustrate example graphs of depth vs. elevation beam plots according to some implementations.
Figure 12B:
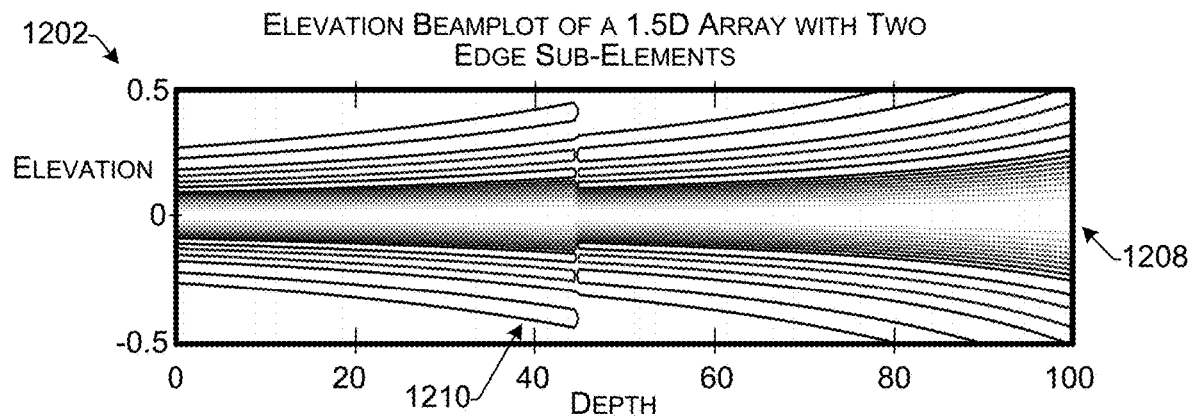
Figure 12C:
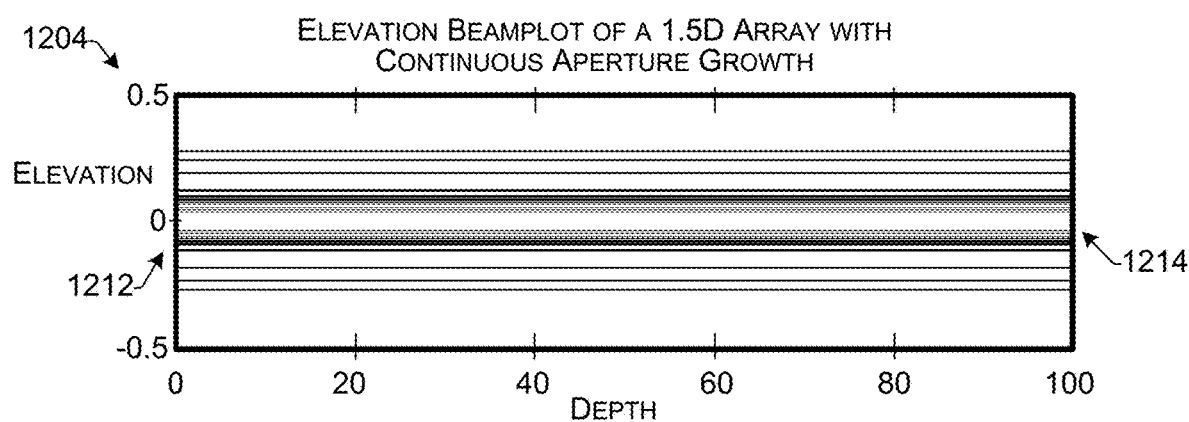

FIGS. 12A, 12B, and 12C illustrate example graphs 1200, 1202, and 1204, respectively, of depth vs. elevation beam plots. FIG. 12A, illustrates a beam plot graph 1200 of an ultrasonic beam produced by a typical 1D array. The example of FIG. 12A shows that the beamwidth increases in the elevation direction as the imaging depth increases. As indicated at 1206, the beamwidth becomes too wide to be useful after certain depth.

FIG. 12B illustrates a beam plot graph 1202 of an ultrasonic beam produced by a typical CMUT array with two edge bias controllable regions. As indicated at 1208, the beamwidth may remain relatively narrow through the entire imaging region. However, as indicated, e.g., at 1210, the beamwidth may be non-uniform, may include a discontinuity between the near field region and far field region, and may include two elevation aperture sizes.

FIG. 12C illustrates a beam plot graph 1204 of an ultrasonic beam produced by a 1.5D array using an elevation aperture growth scheme according to some implementations herein. In this example, the graph 1204 represents an example elevation beamplot of a 1.5D array employing continuous aperture growth based on varying bias voltages applied to different bias controllable regions of a plurality of elements of a CMUT array. For instance, as indicated from 1212 to 1214, the elevation beamwidth may remain constant throughout an entire imaging depth when the elevation aperture grows at the same rate as the penetration depth increases. Accordingly, using the techniques discussed, e.g., with respect to FIGS. 13 and 14, implementations herein may avoid beam formation issues, such as the elevation beamwidth increasing with imaging depth and becoming too wide after a certain depth as in FIG. 12A, or situations in which the beamwidth is non-uniform, such as having a discontinuity between near field region and far field region, e.g., with two elevation aperture sizes, as in FIG. 12B. Rather, in this example, by applying the techniques herein, the beamwidth may remain relatively narrow and uniform through the targeted imaging region (depth). The uniform beamwidth shown in FIG. 12C throughout an entire imaging depth is an ideal case according to some examples. Depending on the accuracy of the control and/or other considerations, the beamwidth achieved in implementations herein may be deviated along the imaging depth, but typically is substantially tighter than those illustrated in FIGS. 12A and 12B.

Figure 13:
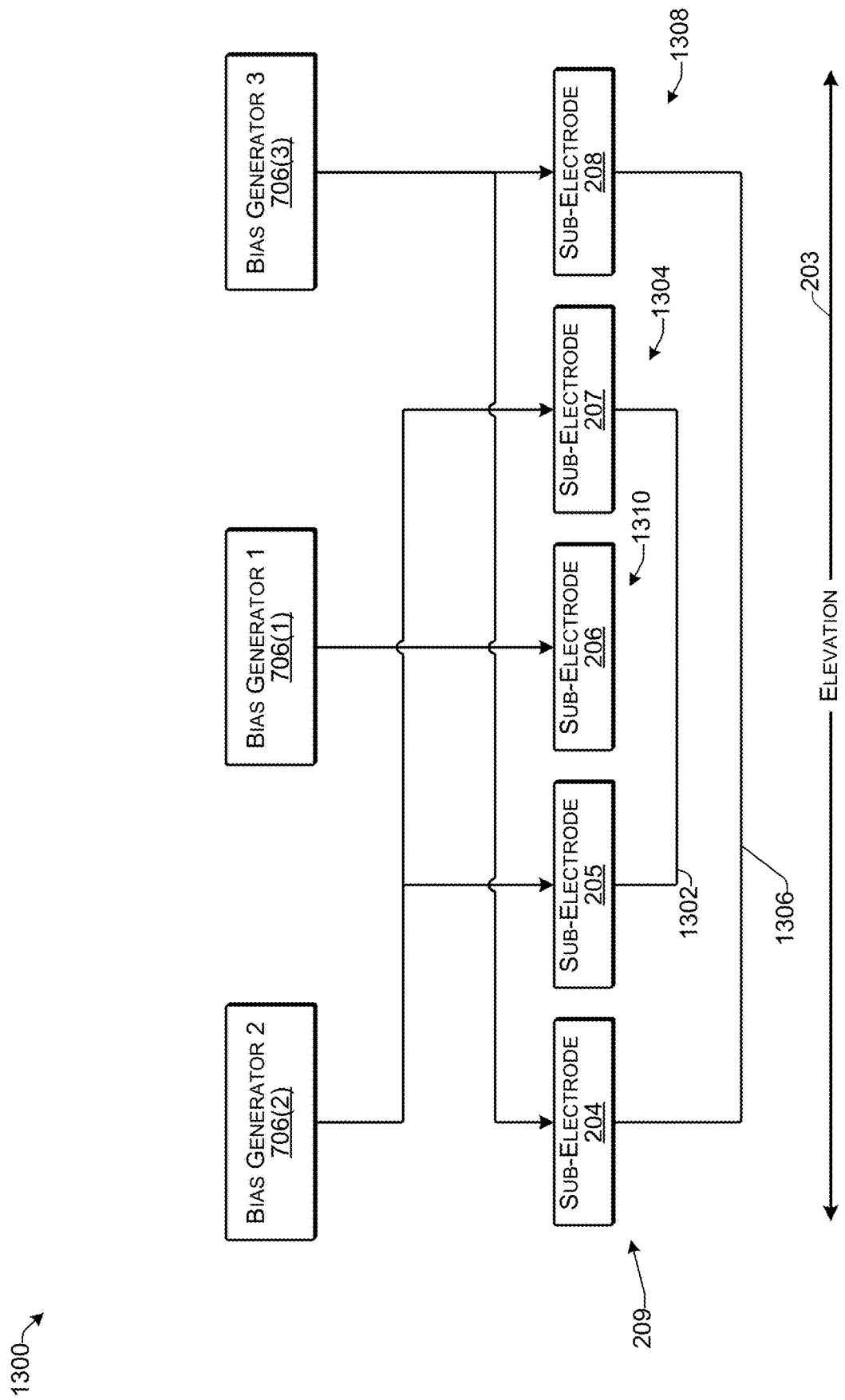
FIG. 13 illustrates an example bias generator arrangement for controlling elevation aperture growth according to some implementations.

FIG. 13 illustrates an example bias generator arrangement 1300 for controlling elevation aperture growth according to some implementations. In this example, the bottom electrode 209 of the CMUT element 200 of FIGS. 2 and 3 may include the five sub-electrodes 204-208 in the elevation dimension 203. The arrangement 1300 includes three independent bias generators 706(1), 706(2), and 706(3), each capable of generating a different bias voltage independently of the other bias generators 706(1), 706(2), and 706(3). Further, the bias generators 706(1), 706(2), and 706(3) may be controlled to supply monotonically increasing bias voltages to particular sub-electrodes of the five sub-electrodes 204-208.

In this example, each bias generator 706 may correspond to a sub-electrode group of one or more sub-electrodes. Further, when more than one sub-electrode is included in a sub-electrode group, the sub-electrodes in the group may be connect together. For instance, the two middle sub-electrodes 205 and 207 may be electrically connected together at 1302 to form a sub-electrode group 1304 for sharing the bias voltage provided by the second bias generator $V_{bias2}$ 706(2). Similarly, the two outer sub-electrodes 204 and 208 may be electrically connected together at 1306 to form a sub-electrode group 1308 for sharing the bias voltage provided by the third bias generator $V_{bias3}$ 706(3). Further, the center sub-electrode 206 uses the bias voltage provided by the first bias generator $V_{bias1}$ 706(1), and may form its own sub-electrode group 1310. The three sub-electrode groups 1304, 1308, and 1310 of each CMUT element 200 may be AC-coupled together to use a single system channel in 1.25D arrangement. The three sub-electrodes groups 1304, 1308, and 1310 of each CMUT element 200 may have separate signal paths before being connected to the same system channel. For instance, such a signal path may include a delay unit, a gain/attenuating unit, or both.

Figure 14A:
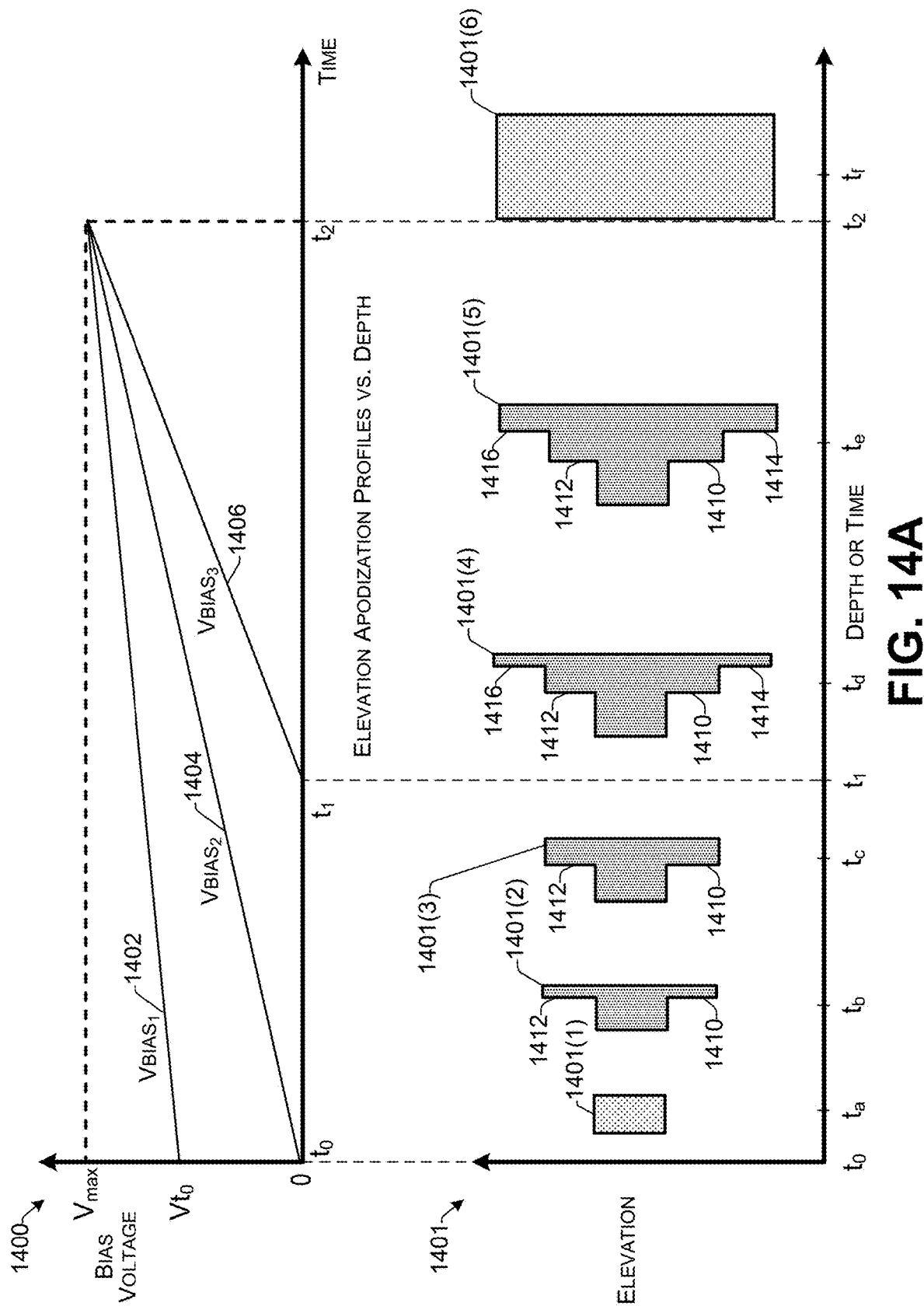
FIGS. 14A-14G illustrate example graphs showing bias voltage vs. time according to some implementations.

FIGS. 14A-14G illustrate example graphs showing bias voltage vs. time according to some implementations. The example graphs may be representative of system operation during the receive phase of the system operation. For instance, the system may operate in a transmit phase, a receive phase and an idle phase. In FIG. 14A, a graph 1400 shows voltage vs. time and corresponding example elevation apodization profiles 1401 over time according to some implementations. The graph 1400 includes three bias voltage curves that linearly increase with time.

In the example graph 1400, a first curve 1402 represents the first bias voltage $V_{bias1}$ produced by the first bias generator 706(1) in FIG. 13. The first bias voltage $V_{bias1}$ may initially be $Vt_0$, which may be a non-zero voltage to ensure that the center region of the CMUT element corresponding to sub-electrode 206 starts with a reasonable reception sensitivity value for near field imaging. In this example, the first bias voltage $V_{bias1}$ may linearly increase with time until reaching the maximum value $V_{max}$ at a time $t_2$. Since the sensitivity of the sub-element is approximately proportional to the bias voltage squared, as discussed above with respect to FIG. 11, the reception sensitivity of the center region may increase significantly over time and/or the penetration depth to at least partially compensate for acoustic energy loss that may be caused by tissue attenuation.

Furthermore, after reaching the maximum value $V_{max}$, the first bias voltage $V_{bias1}$ may remain at $V_{max}$ until at least a display depth is reached. The level of the first bias voltage $V_{bias1}$ may subsequently either be changed to another level or remain at $V_{max}$ before the transmit phase starts. After the transmit phase is finished, the first bias voltage $V_{bias1}$ may be reset to the initial value $Vt_0$. For instance, the transmit phase may be a period of time during which some or all of the CMUT elements are excited by electrical pulses at either the same or different times. Additionally, in examples herein, penetration depth d may be equal to a product of time t and acoustic velocity v, i.e., d=v·t. Penetration depth is affected by the elevation apodization profile and may be proportional to the bias voltage. Further, the display depth may correspond to the maximum depth shown on a display (e.g., display 622 of FIG. 6).

In addition, in the graph 1400, the middle curve 1404 represents the second bias voltage $V_{bias2}$ produced by the second bias generator 706(2) of FIG. 13. The second bias voltage $V_{bias2}$ in this case may start at 0 at time $t_0$ and linearly increase with time until reaching the maximum value $V_{max}$ at time $t_2$. Furthermore, the bottom curve represents the third bias voltage $V_{bias3}$ produced by the third bias generator 706(3). The third bias voltage $V_{bias3}$ may start at a specified time $t_1$, and may linearly increase with time until $V_{bias3}$ reaches the maximum value $V_{max}$ at time $t_2$.

The different timings and bias voltage values of the bias voltages $V_{bias1}$, $V_{bias2}$, and $V_{bias3}$ to the respective sub-electrodes causes a change in the elevation apodization profile 1401 for the CMUT electrode 200 over time. The apodization profile 1401 may correspond to the curves 1402, 1404, and 1406 illustrated in the graph 1400 over time. At a time $t_a$, close to the beginning (e.g., shortly after time $t_0$), a first elevation apodization profile 1401(1) may be generated by the CMUT element 200 in the elevation dimension. Because the bias voltage $V_{bias2}$ applied to the two middle regions corresponding to the sub-electrodes 205 and 207 is close to zero at time $t_a$, and the bias voltage $V_{bias3}$ applied to the two outside regions corresponding to the sub-electrodes 204 and 208 is zero at time $t_{0a}$, only the center region corresponding to sub-electrode 206 contributes to elevation aperture and, therefore, the resulting elevation apodization profile 1401(1) at time $t_a$ may resemble a simple rectangle.

After a while, e.g., at a time $t_b$, however, the second bias voltage $V_{bias2}$ is increasing in the two middle regions corresponding to the sub-electrodes 205 and 207, and these middle regions start to make a contribution to the elevation aperture. The resulting elevation apodization profile 1401(2) includes steps 1410 and 1412 on either side of the original rectangle. At time $t_c$, the third bias voltage $V_{bias3}$ still does not make a contribution to the apodization profile 1401(3), but the steps 1410 and 1504 from the second bias voltage $V_{bias2}$ become thicker as the contribution of the second bias voltage $V_{bias2}$ increases.

After time $t_1$, e.g., at a time $t_d$, the third bias voltage $V_{bias3}$ is increasing in the two outer bias controllable regions corresponding to the sub-electrodes 204 and 208 and these outer bias controllable regions start to make a contribution to the elevation aperture. The resulting elevation apodization profile 1401(4) includes steps 1414 and 1416 on either side of the original rectangle and the steps 1410 and 1412, respectively. At a time $t_e$, the third bias voltage $V_{bias3}$ continues to make a larger contribution to the elevation apodization profile 1401(5) and the steps 1414 and 1416 become thicker. Subsequently, at time $t_2$, all the three regions reach their maximum sensitivity and the resulting apodization profile 1401(6) resembles another, larger rectangle. After reaching the maximum value, the bias voltage may remain at $V_{max}$ until at least the display depth is reached. The bias voltage can either be changed to another level or remain at $V_{max}$ before the transmit phase starts. Once the transmit phase is finished, the bias voltages may be reset.

Although only five bias controllable regions corresponding to five sub-electrodes are described in the above example, the number of bias controllable regions or corresponding sub-electrodes may be any desired number. In some examples, the number of sub-electrodes may be any odd number, such as 3, 5, . . . , 2n+1, so that the sub-electrodes are symmetrically arranged one either side of a center electrode. For 2n+1 sub-electrodes, n+1 independent bias supplies may be employed in some examples.

All the three bias voltages are described as increasing linearly in the above example, but some or all of the bias voltages may employ any monotonically increasing nonlinear function with time. For example, one or more of the three bias voltages may increase exponentially with time, such as to match the tissue attenuation rate. Furthermore, the maximum values $V_{max}$ of the three bias voltages are shown to be the same in this example. However, the maximum values $V_{max}$ may be different for each of the different bias voltage curves (e.g., corresponding to the different bias generators) in other examples, as long as the resulting apodization profile is not a reversed window shape. In addition, all three of the bias voltages are shown to reach their maximum values $V_{max}$ at the same time in the above example, but they may reach their maximum values at different times, such as to achieve different sensitivity effects.

Figure 14B:
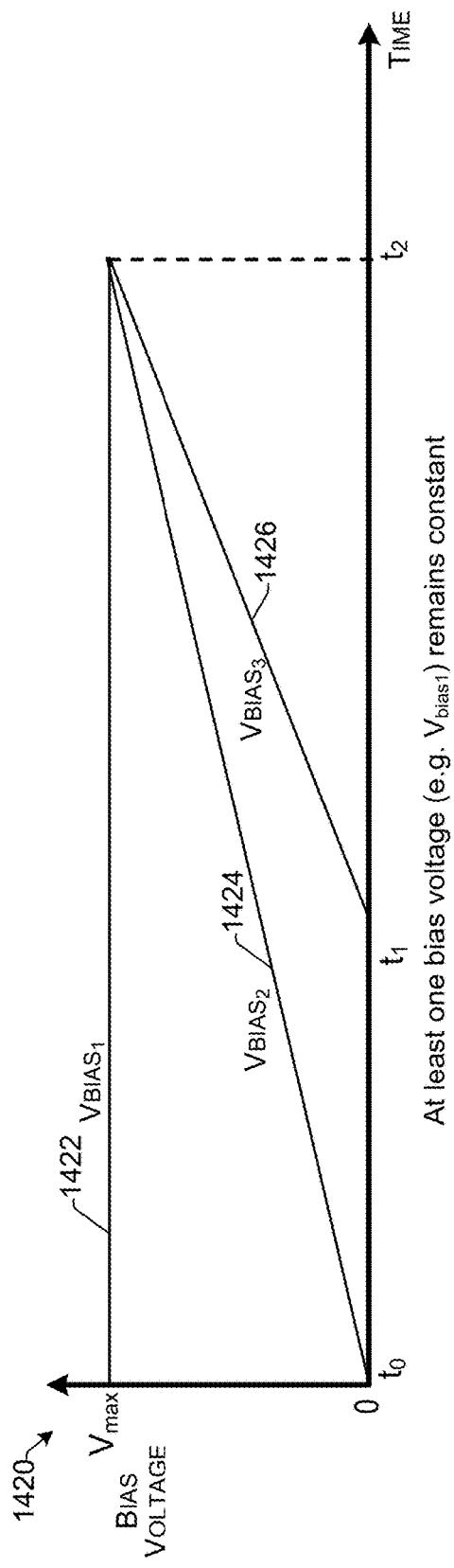

FIG. 14B illustrates an example graph 1420 showing bias voltage vs. time according to some implementations. In this example, the graph 1420 includes three bias voltage curves, namely, $V_{bias1}$ 1422, $V_{bias2}$ 1424, and $V_{bias3}$ 1426. The first bias voltage $V_{bias1}$ may initially be $V_{max}$, and may remain constant from time $t_0$ to time $t_2$. Furthermore, in the example of FIG. 14B, the second bias voltage $V_{bias2}$ 1424 produced by the second bias generator may start at 0 at time $t_0$ and linearly increase with time until reaching the maximum value $V_{max}$ at time $t_2$. Additionally, the third bias voltage $V_{bias3}$ 1426 produced by the third bias generator may start at a specified time $t_1$, and may linearly increase with time until $V_{bias3}$ reaches the maximum value $V_{max}$ at time $t_2$. Further, in other examples, more than one bias voltage may remain constant.

Figure 14C:
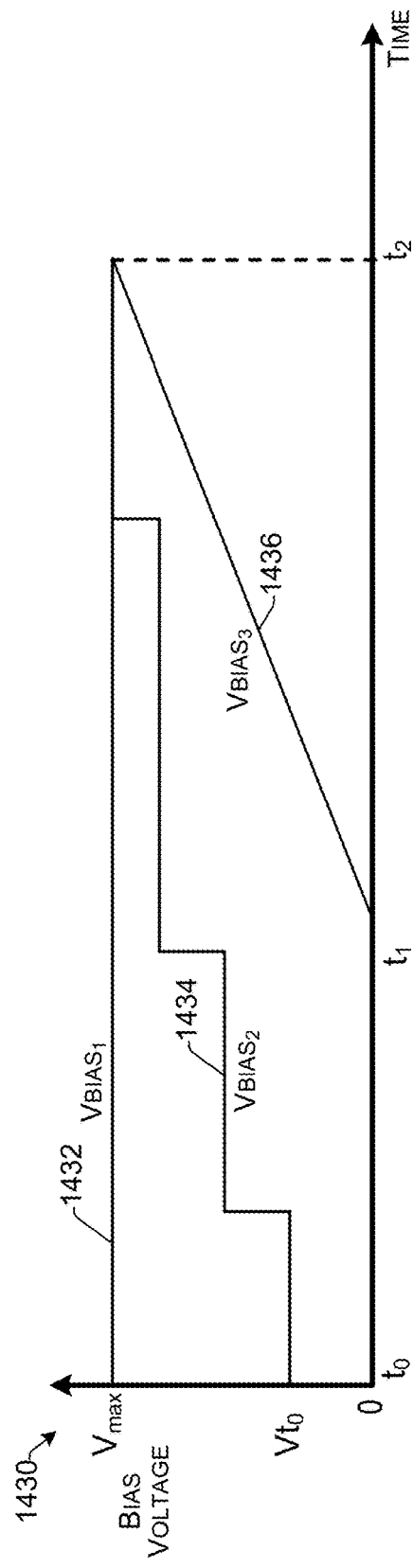

FIG. 14C illustrates an example graph 1430 showing bias voltage vs. time according to some implementations. In this example, the graph 1430 includes three bias voltage curves, namely, $V_{bias1}$ 1432, $V_{bias2}$ 1434, and $V_{bias3}$ 1436. The first bias voltage $V_{bias1}$ may initially be $V_{max}$, and may remain constant from time $t_0$ to time $t_2$. Furthermore, in the example of FIG. 14C, the second bias voltage $V_{bias2}$ 1434 produced by the second bias generator may start at a non-zero voltage $Vt_0$ at time $t_0$ and increase in a series of steps with time until reaching the maximum value $V_{max}$ prior to time $t_2$. Additionally, the third bias voltage $V_{bias3}$ 1436 produced by the third bias generator may start at a specified time $t_1$, and may linearly increase with time until $V_{bias3}$ reaches the maximum value $V_{max}$ at time $t_2$. Further, in other examples, more than one bias voltage may increase in a step-wise manner.

Figure 14D:
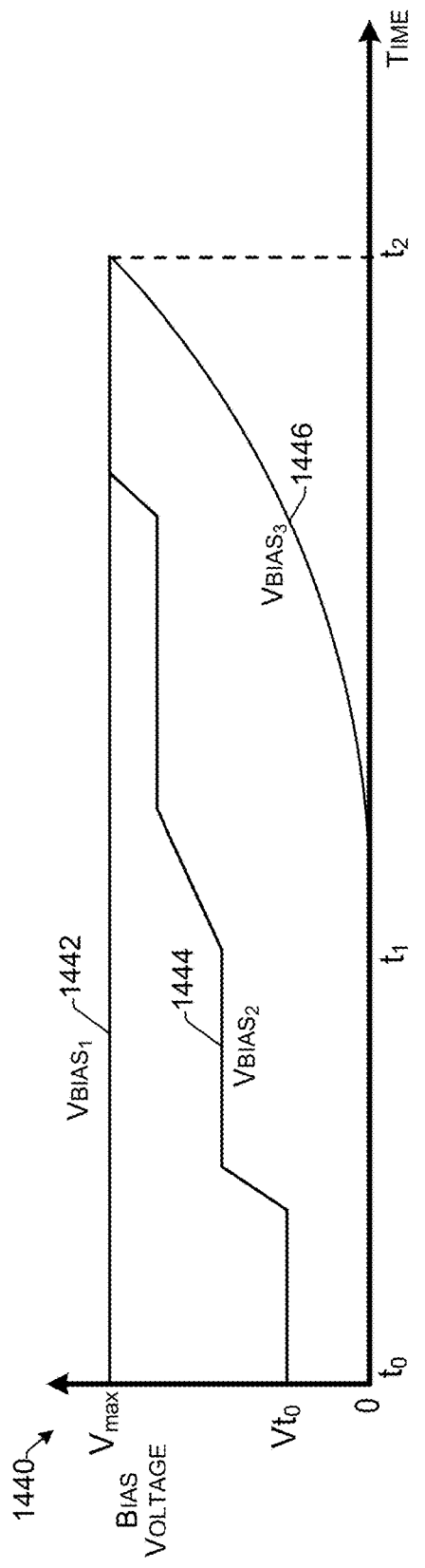

FIG. 14D illustrates an example graph 1440 showing bias voltage vs. time according to some implementations. In this example, the graph 1440 includes three bias voltage curves, namely, $V_{bias1}$ 1442, $V_{bias2}$ 1444, and $V_{bias3}$ 1446. The first bias voltage $V_{bias1}$ may initially be $V_{max}$, and may remain constant from time $t_0$ to time $t_2$. Furthermore, in the example of FIG. 14D, the second bias voltage $V_{bias2}$ 1444 produced by the second bias generator may start at a non-zero voltage $Vt_0$ at time to and increase in any desired pattern with time until reaching the maximum value $V_{max}$ prior to time $t_2$. Additionally, the third bias voltage $V_{bias3}$ 1446 produced by the third bias generator may start at a specified time $t_1$, and may increase in any desired pattern with time until $V_{bias3}$ reaches the maximum value $V_{max}$ at time $t_2$. Further, in other examples, the first bias voltage $V_{bias1}$ may also increase in any desired pattern.

Figure 14E:
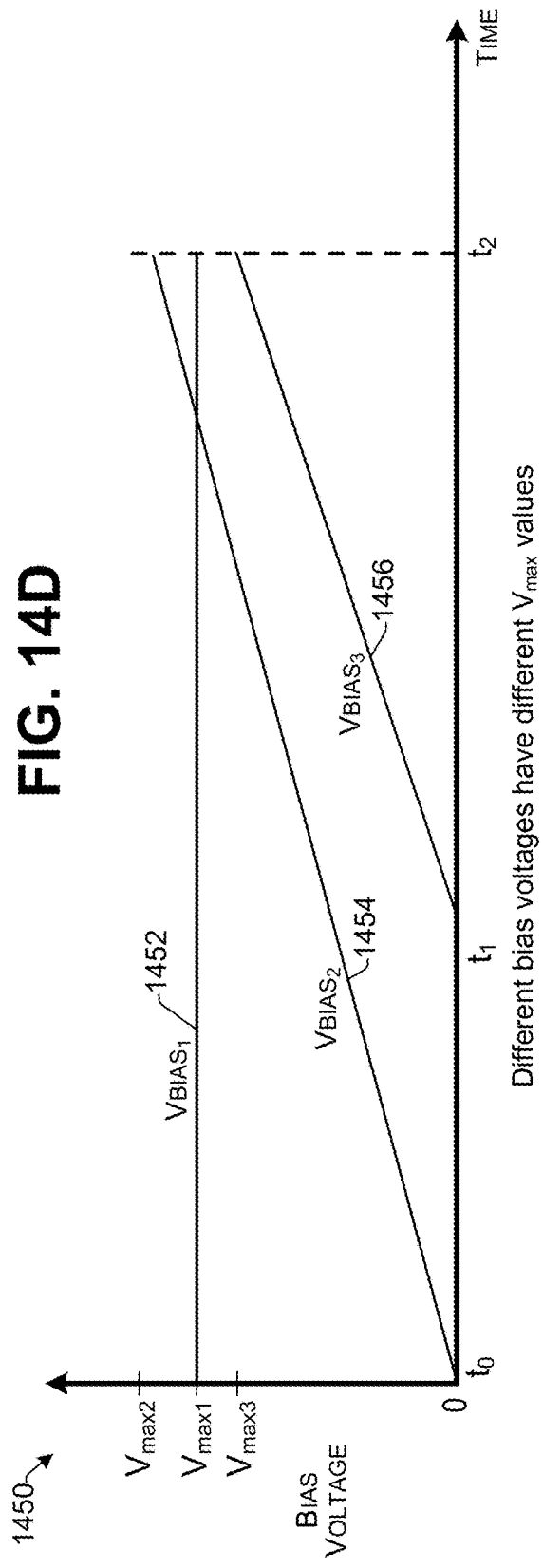

FIG. 14E illustrates an example graph 1450 showing bias voltage vs. time according to some implementations. In this example, the graph 1450 includes three bias voltage curves, namely, $V_{bias1}$ 1452, $V_{bias2}$ 1454, and $V_{bias3}$ 1456 that each have a different value for $V_{max}$. The first bias voltage $V_{bias1}$ may initially be at a first maximum value $V_{max1}$, and may remain constant from time $t_0$ to time $t_2$. Furthermore, in the example of FIG. 14E, the second bias voltage $V_{bias2}$ 1454 produced by the second bias generator may start at 0 at time $t_0$ and linearly increase with time until reaching a second maximum value $V_{max2}$ at time $t_2$. Additionally, the third bias voltage $V_{bias3}$ 1456 produced by the third bias generator may start at a specified time $t_1$, and may linearly increase with time until $V_{bias3}$ reaches a third maximum value $V_{max3}$ at time $t_2$.

Figure 14F:
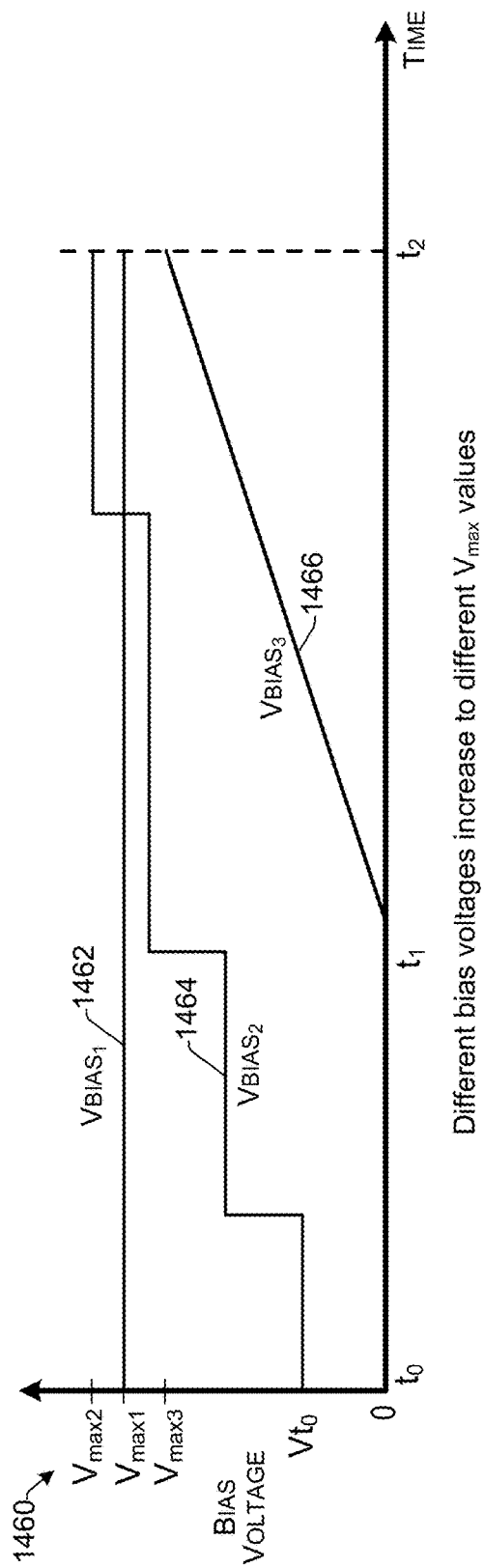

FIG. 14F illustrates an example graph 1460 showing bias voltage vs. time according to some implementations. In this example, the graph 1460 includes three bias voltage curves, namely, $V_{bias1}$ 1462, $V_{bias2}$ 1464, and $V_{bias3}$ 1466 that each have a different value for $V_{max}$. The first bias voltage $V_{bias1}$ may initially be a first maximum value $V_{max1}$, and may remain constant from time $t_0$ to time $t_2$. Furthermore, in the example of FIG. 14F, the second bias voltage $V_{bias2}$ 1464 produced by the second bias generator may start at a non-zero voltage $Vt_0$ at time $t_0$ and increase in a series of steps with time until reaching a second maximum value $V_{max2}$ prior to time $t_2$. Additionally, the third bias voltage $V_{bias3}$ 1466 produced by the third bias generator may start at a specified time $t_1$, and may increase linearly with time until $V_{bias3}$ reaches a third maximum value $V_{max3}$ at time $t_2$. Further, in other examples, the first bias voltage $V_{bias1}$ and/or the third bias voltage $V_{bias3}$ may also increase in a series of steps or any other desired pattern.

Figure 14G:
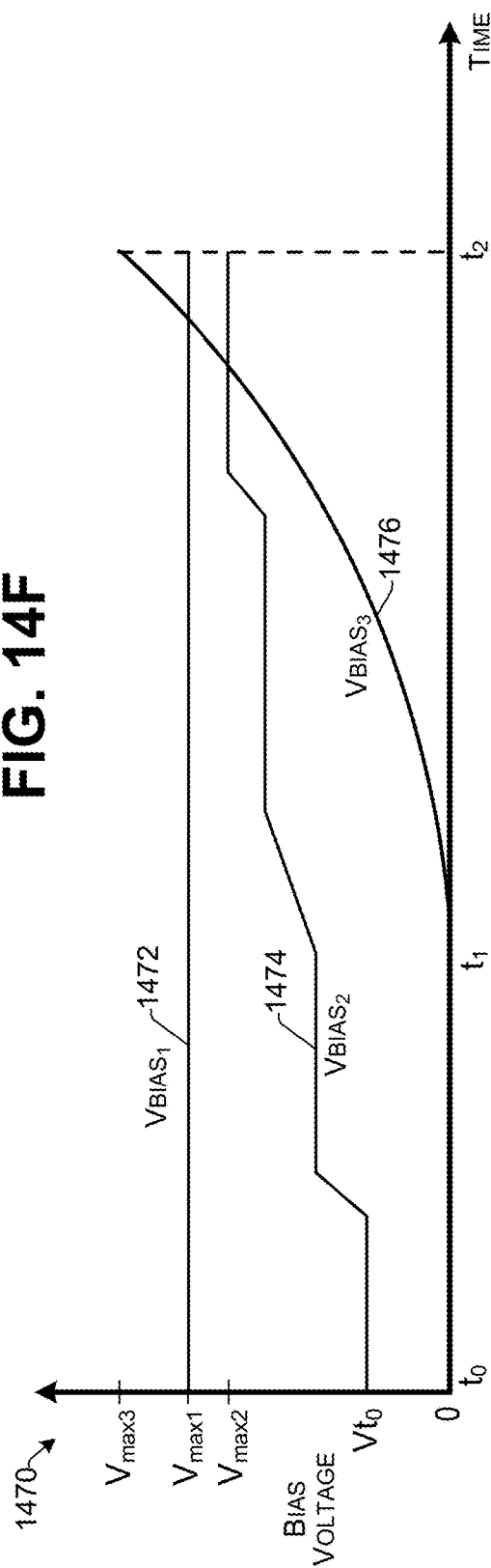

FIG. 14G illustrates an example graph 1470 showing bias voltage vs. time according to some implementations. In this example, the graph 1470 includes three bias voltage curves, namely, $V_{bias1}$ 1472, $V_{bias2}$ 1474, and $V_{bias3}$ 1476 that each have a different value for $V_{max}$. The first bias voltage $V_{bias1}$ may initially be at a first maximum value $V_{max1}$, and may remain constant from time $t_0$ to time $t_2$. Furthermore, in the example of FIG. 14G, the second bias voltage $V_{bias2}$ 1474 produced by the second bias generator may start at a non-zero voltage $Vt_0$ at time $t_0$ and increase in any desired pattern with time until reaching a second maximum value $V_{max2}$ e.g., prior to time $t_2$. Additionally, the third bias voltage $V_{bias3}$ 1476 produced by the third bias generator may start at a specified time $t_1$, and may increase in any desired pattern with time until $V_{bias3}$ reaches a third maximum value $V_{max3}$ at time $t_2$. Further, in other examples, the first bias voltage $V_{bias1}$ may also increase in any desired pattern.

The above example graphs of FIGS. 14A-14G illustrate multiple bias voltage curves that are non-decreasing functions of time for increasing effective elevation aperture size. Thus, each of the bias voltage curves represents a respective bias voltage that is constant or increasing over time and, as a result, the effective elevation aperture size also is constant or increasing.

FIGS. 15A-15B illustrate graphs showing examples bias voltage and focus depth according to some implementations. In transmission (TX) operation, for different transmission foci (i.e., imaging depths), the bias voltages supplied for each of the sub-electrodes may be changed to achieve desired equivalent aperture sizes. Usually, when the imaging depth (i.e., focus) increases, the equivalent aperture size may also increase, namely, the bias voltages on each sub-electrode may be increased as well. FIGS. 15A and 15B show two example cases that may include operation of the example CMUT discussed above with respect to FIG. 2 and/or FIG. 3.

FIG. 15A illustrates a graph 1500 including examples of bias voltages and focal depths according to some implementations. In the example of FIG. 15A, as indicated at 1502, for a first imaging depth/focus (e.g., near field), only the center sub-electrode (e.g., 206 of FIG. 2) may have the bias voltage. For a second imaging depth/focus (e.g., middle field), as indicated at 1504, both the center sub-electrode (e.g., 206 of FIG. 2) and/or the sub-electrodes (e.g., 205 and 207 of FIG. 2), next to the center sub-electrode, may have bias voltages. For a third imaging depth/focus (e.g., far field), as indicated at 1506, all sub-electrodes (e.g., 204-208 of FIG. 2) may have bias voltages. In this example, $V_{MAX}$ (e.g. $V_{1MAX}$, $V_{2MAX}$, $V_{3MAX}$, etc.) indicates the maximum voltage level for each bias voltage.

FIG. 15B illustrates a graph 1510 including examples of bias voltages and focal depths according to some implementations. In the example of FIG. 15B, each of the bias voltages may turn on and increase for different imaging depths (or transmission focuses). In this example, as indicated at 1512, for a first imaging depth/focus (e.g. near field), only the center sub-electrode (e.g. 206 of FIG. 2) may have the bias voltage. For a second imaging depth/focus (e.g., middle field), as indicated at 1514, both the center sub-electrode (e.g. 206 of FIG. 2) and/or the sub-electrodes (e.g., 205 and 207 of FIG. 2), next to the center sub-electrode, may have bias voltages. For a third imaging depth/focus (e.g., far field), as indicated at 1516, all sub-electrodes (e.g., 204-208 of FIG. 2) may have bias voltages. Furthermore, as indicated at 1518 through 1520, the bias voltages may be increased for some or all of the electrodes 204, 205, 207, 208, to focus the imaging depth to a desired depth/focal point. The relative levels of $V_{1MAX}$, $V_{2MAX}$, and $V_{3MAX}$ shown in both FIGS. 15A and 15B are for illustration purposes, and the actual values may be determined based at least partially on the actual CMUT design and desired imaging operation.

Figure 16:
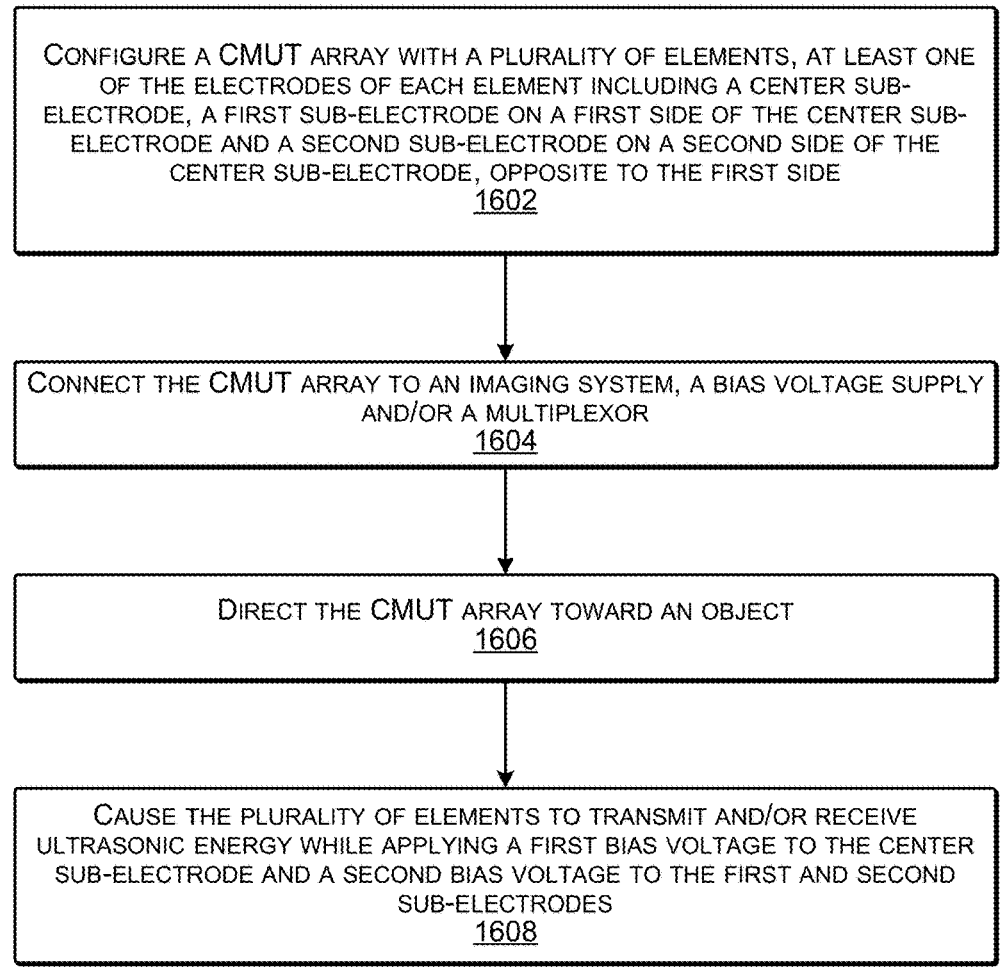
FIG. 16 is a flow diagram illustrating an example process for applying bias voltages to sub-elements according to some implementations.

FIGS. 16 and 17 are flow diagrams illustrating example processes according to some implementations. The processes are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks may be combined in any order and/or in parallel to implement the processes, or alternative processes, and not all of the blocks need be executed. For discussion purposes, the processes are described with reference to the apparatuses, architectures and systems described in the examples herein, although the processes may be implemented in a wide variety of other apparatuses, architectures and systems.

FIG. 16 is a flow diagram illustrating an example process 1600 for applying bias voltages to bias controllable regions according to some implementations. The process may be executed, at least in part by a processor programmed or otherwise configured by executable instructions.

At 1602, a CMUT array may be configured with a plurality of elements, at least one of the electrodes of each element including a center sub-electrode, a first sub-electrode on a first side of the center sub-electrode and a second sub-electrode on a second side of the center sub-electrode, opposite to the first side. The bias voltages to the sub-electrodes may be independent controlled. Accordingly, each element may include a center bias controllable region, a first bias controllable region on a first side of the center bias controllable region, and a second bias controllable region on a second side of the center bias controllable region, opposite to the first side. Further, in some cases, additional sub-electrodes and corresponding additional bias controllable regions may be included in each element, such as, for each element, a third sub-electrode and corresponding third bias controllable region on a side of the first bias controllable region opposite to the center bias controllable region, and a fourth sub-electrode and corresponding fourth bias controllable region, on a side of the second bias controllable region opposite to the center bias controllable region. Additional sub-electrodes and corresponding bias controllable regions may also be included in some or all of the elements of the CMUT array.

At 1604, the CMUT array may be connected to an imaging system, a bias voltage supply, and/or a multiplexor. In some cases, the CMUT array may be included in a probe that includes or is connected to the imaging system, bias voltage supply, and/or multiplexor.

At 1606, the CMUT array may be directed toward an object. For example, for medical imaging, the CMUT array may be directed toward human tissue.

At 1608, a processor in the system may cause the plurality of elements to transmit and/or receive ultrasonic energy while applying a first bias voltage to the center sub-electrode and a second bias voltage to the first and second sub-electrodes. Accordingly, the processor may cause the plurality of elements to transmit and/or receive ultrasonic energy while applying a first bias voltage to the center bias controllable region and a second bias voltage to the first and second bias controllable regions. For instance, the first bias voltage may be different from the second bias voltage. In some examples, the first bias voltage may be applied at a different time from the second bias voltage. Further, in some examples, at least one of the first bias voltage or the second bias voltage may be applied as an increasing bias voltage that increases over time. For instance, the processor may apply the first bias voltage or the second bias voltage as monotonically increasing voltages that increase over time, e.g., such that the second bias voltage increases faster over time than the first bias voltage.

FIG. 17 is a flow diagram illustrating an example process 1700 for applying bias voltages to bias controllable regions according to some implementations. The process may be executed, at least in part by a processor programmed or otherwise configured by executable instructions.

At 1702, a CMUT array may be configured with a plurality of elements, at least one of the electrodes of each element including a center sub-electrode, a first sub-electrode on a first side of the center sub-electrode, a second sub-electrode on a second side of the center sub-electrode, opposite to the first side, a third sub-electrode on a side the first sub-electrode opposite to the center sub-electrode, and a fourth sub-electrode on a side the second sub-electrode opposite to the center sub-electrode. Accordingly, each element may include a center bias controllable region, a first bias controllable region on a first side of the center bias controllable region, and a second bias controllable region on a second side of the center bias controllable region, opposite to the first side. Further, a third bias controllable region may be included on a side of the first bias controllable region, opposite to the center bias controllable region, and a fourth bias controllable region may be included on a side of the second bias controllable region, opposite to the center bias controllable region. Additional sub-electrodes and corresponding additional bias controllable regions may also be included in the CMUT array.

At 1704, the CMUT array may be connected to an imaging system, bias voltage supply, and/or multiplexor. In some cases, the CMUT array may be included in a probe that includes or is connected to the imaging system, bias voltage supply, and/or multiplexor.

At 1706, the CMUT array is directed toward an object. For example, for medical imaging, the CMUT array may be directed toward human tissue.

At 1708, a processor in the system may cause the plurality of elements to transmit ultrasonic energy while applying, at a first time, a first bias voltage to the center sub-electrode and a second bias voltage to the first and second sub-electrodes. Thus, the processor may cause the plurality of elements to transmit ultrasonic energy while applying, at a first time, a first bias voltage to the center bias controllable region and a second bias voltage to the first and second bias controllable regions.

At 1710, the processor may increase the respective bias voltages applied to the center sub-electrode and the first and second sub-electrodes over time and, in some examples, at different rates. Thus, the processor may increase the respective bias voltages applied to the center bias controllable region and the first and second bias controllable regions over time. In some examples, the respective bias voltages may be increased at different rates, such as increasing the second bias voltage faster than the first bias voltage.

At 1712, the processor may apply, apply, at a second time, a third bias voltage to the third and fourth sub-electrodes during application of the first and second bias voltages. Thus, at the second time, the processor may apply a third bias voltage to the third and fourth bias controllable regions during application of the first and second bias voltages.

At 1714, the processor may increase the third bias voltage over time. In some examples, the processor may increase the third bias voltage over time at a different rate from the first and second bias voltages.

At 1716, the system may be present an image based on received reflected ultrasound energy. For instance, the CMUT array may receive reflected ultrasonic energy, e.g., the CMUT array may receive ultrasound signals for imaging in addition to transmitting the ultrasound signals. Further, the system may include one or more processors that process the received ultrasound energy and present an image on a display based on processing of the received ultrasound signal.

The example processes described herein are only examples of processes provided for discussion purposes. Numerous other variations will be apparent to those of skill in the art in light of the disclosure herein. Further, while the disclosure herein sets forth several examples of suitable systems, architectures and apparatuses for executing the processes, implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Various instructions, methods, and techniques described herein may be considered in the general context of computer-executable instructions, such as program modules stored on computer-readable media, and executed by the processor(s) herein. Generally, program modules include routines, programs, objects, components, data structures, etc., for performing particular tasks or implementing particular abstract data types. These program modules, and the like, may be executed as native code or may be downloaded and executed, such as in a virtual machine or other just-intime compilation execution environment. Typically, the functionality of the program modules may be combined or distributed as desired in various implementations. An implementation of these modules and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A system comprising:
  a capacitive micromachined ultrasonic transducer (CMUT) array having a plurality of CMUT elements, individual ones of the CMUT elements including:
    a first sub-electrode disposed on a first side of a plurality of first CMUT cells corresponding to a first bias controllable region of the array,
    a second sub-electrode disposed on a first side of a plurality of second CMUT cells corresponding to a second bias controllable region of the array,
    a third sub-electrode disposed laterally between the first sub-electrode and the plurality of first CMUT cells and the second sub-electrode and the plurality of second CMUT cells, the third sub-electrode disposed on a first side of a plurality of third CMUT cells corresponding to a third bias controllable region of the array, and
    a common electrode disposed on a second side of the plurality of first CMUT cells, a second side of the plurality of second CMUT cells, and a second side of the plurality of third CMUT cells;
  a bias voltage supply for supplying bias voltages to the first, second, and third sub-electrodes; and
  a processor configured to control application of the bias voltages to apply a first bias voltage to the third sub-electrode and a second bias voltage to the first and second sub-electrodes during use of the CMUT array for imaging, wherein the first bias voltage applied to the third sub-electrode has a first waveform and the second bias voltage applied to the first and second sub-electrodes has a second waveform, wherein the first waveform differs from the second waveform by at least one of shape, slope, or maximum value.

2. The system as recited in claim 1, wherein the processor is further configured to apply at least one of the first bias voltage or the second bias voltage as a bias voltage that increases over time.

3. The system as recited in claim 1, wherein the processor is further configured to:
  apply, at a first point in time, the first bias voltage as an increasing bias voltage that increases over time; and
  begin applying, at a second point in time, the second bias voltage as an increasing bias voltage that increases over time at a different rate than the first bias voltage, wherein the second point in time is later than the first point in time.

4. The system as recited in claim 1, wherein the processor is further configured to apply the first bias voltage and the second bias voltage as monotonically increasing voltages that increase over time, wherein the second bias voltage increases faster over time than the first bias voltage.

5. The system as recited in claim 1, wherein:
  the individual CMUT elements further comprise:
    a fourth sub-electrode adjacent to the first sub-electrode on a third side of the first sub-electrode opposite from the third sub-electrode, the fourth sub-electrode associated with one or more fourth CMUT cells corresponding to a fourth bias controllable region of the array;
    a fifth sub-electrode adjacent to the second sub-electrode on a third side of the second sub-electrode opposite from the third sub-electrode, the fifth sub-electrode associated with one or more fifth CMUT cells corresponding to a fifth bias controllable region of the array; and
  the processor is further configured to apply a third bias voltage to the fourth and fifth sub-electrodes during use of the CMUT array for imaging, wherein the third bias voltage is at least one of:
    applied at a different voltage than the second bias voltage and the first bias voltage, or
    applied at a different timing than the second bias voltage and the first bias voltage.

6. The system as recited in claim 5, wherein the processor is further configured to control an elevation apodization profile of the array by:
  applying, at a first time, the first bias voltage as an increasing voltage that increases over time;
  applying, at the first time, the second bias voltage as an increasing voltage that increases over time, wherein at the first time, the first bias voltage is greater than the second bias voltage; and
  applying, at a second time, later than the first time, the third bias voltage as an increasing voltage that increases over time, wherein at the second time, the first bias voltage and the second bias voltage are greater than the third bias voltage.

7. The system as recited in claim 5, wherein:
  the first sub-electrode and the second sub-electrode are electrically connected to each other; and
  the fourth sub-electrode and the fifth sub-electrode are electrically connected to each other.

8. The system as recited in claim 1, further comprising:
  a multiplexor in communication with the processor and the plurality of CMUT elements; and
  one or more computer-readable media storing instructions executable by the processor, wherein the instructions program the processor to:
    control the multiplexor for causing a first plurality of the third sub-electrodes and a second plurality of the first and second sub-electrodes to transmit ultrasonic energy;
    apply the first bias voltage to the first plurality of third sub-electrodes as a first monotonically increasing voltage over time; and
    apply the second bias voltage to the second plurality of the first and second sub-electrodes as a second monotonically increasing voltage over time.

9. The system as recited in claim 1, wherein the bias voltage supply comprises an analog bias voltage generator, the analog bias voltage generator including a first resistor, a first switch for connecting the first resistor to a first voltage, and a capacitor, wherein closing the first switch causes the capacitor to charge, causing a supplied bias voltage to increase.

10. The system as recited in claim 1, wherein the bias voltage supply comprises a digital bias voltage generator including:

a digital waveform generator for generating a monotonically increasing digital waveform;
a digital-to-analog converter for converting the monotonically increasing digital waveform to an analog voltage signal; and
an amplifier for scaling the analog voltage signal to an indicated bias voltage level to generate a supplied bias voltage.

11. The system as recited in claim 1, wherein:
the first sub-electrode is associated with a first sub-element including the plurality of first CMUT cells having a first resonant frequency;
the second sub-electrode comprises a second region including the plurality of second CMUT cells having the first resonant frequency; and
the third sub-electrode comprises a third region including the plurality of third CMUT cells having a second resonant frequency different from the first resonant frequency.

12. A method comprising:
directing a capacitive micromachined ultrasonic transducer (CMUT) array toward an object, the CMUT array including a plurality of elements, each element including a plurality of first CMUT cells having a first sub-electrode disposed on a first side of the plurality of first CMUT cells, a plurality of second CMUT cells having a second sub-electrode disposed on a first side of the plurality of second CMUT cells, and a plurality of third CMUT cells having a third sub-electrode disposed on a first side of the plurality of third CMUT cells, wherein a common electrode is disposed on a second side of the plurality of first CMUT cells, a second side of the plurality of second CMUT cells, and a second side of the plurality of third CMUT cells, wherein the first sub-electrode and the plurality of first CMUT cells are laterally disposed on a third side of the third sub-electrode and the plurality of third CMUT cells, and wherein the second sub-electrode and the plurality of second CMUT cells are laterally disposed on a fourth side of the third sub-electrode and the plurality of third CMUT cells, opposite to the first third side;
applying, by a processor, a first bias voltage to the third sub-electrode and a second bias voltage to the first and second sub-electrodes, wherein the first bias voltage applied to the third sub-electrode has a first waveform and the second bias voltage applied to the first and second sub-electrodes has a second waveform, wherein the first waveform differs from the second waveform by at least one of shape, slope, or maximum value; and
causing at least one of the first sub-electrode, the second sub-electrode, or the third sub-electrode to transmit and/or receive ultrasonic energy.

13. The method as recited in claim 12, further comprising applying at least one of the first bias voltage or the second bias voltage as an increasing bias voltage that increases over time.

14. The method as recited in claim 12, further comprising:
applying, at a first point in time, the first bias voltage as an increasing bias voltage that increases over time; and
begin applying, at a second point in time, the second bias voltage as an increasing bias voltage that increases over time at a different rate than the first bias voltage, wherein the second point in time is later than the first point in time.

15. The method as recited in claim 12, wherein the CMUT array further includes, for each element, a fourth CMUT cell associated with a fourth sub-electrode on a third side of the first sub-electrode opposite to the third sub-electrode, and a fifth CMUT cell associated with a fifth sub-electrode, on a third side of the second sub-electrode opposite to the third sub-electrode, the method further comprising:
applying a third bias voltage to the fourth sub-electrode and the fifth sub-electrode; and
increasing an aperture over time by causing the first sub-electrode, the second sub-electrode, the third sub-electrode, the fourth sub-electrode, and the fifth sub-electrode to transmit ultrasonic energy while increasing over time two or more of the first bias voltage, the second bias voltage, or the third bias voltage.

16. The method as recited in claim 15, wherein increasing the aperture further comprises increasing the first bias voltage, the second bias voltage, and the third bias voltage at different rates over time.

17. The method as recited in claim 12, wherein the CMUT array further includes, for each element, a fourth CMUT cell associated with a fourth sub-electrode on a third side of the first sub-electrode opposite to the third sub-electrode, and a fifth CMUT cell associated with a fifth sub-electrode, on a third side of the second sub-electrode opposite to the third sub-electrode, the method further comprising:
applying a third bias voltage to the fourth sub-electrode and the fifth sub-electrode; and
controlling an elevation apodization profile of the array by:
applying, at a first time, the first bias voltage as an increasing voltage that increases over time;
applying, at the first time, the second bias voltage as an increasing voltage that increases over time, wherein at the first time, the first bias voltage is greater than the second bias voltage; and
applying, at a second time, later than the first time, the third bias voltage as an increasing voltage that increases over time, wherein at the second time, the first bias voltage and the second bias voltage are greater than the third bias voltage.

18. A system comprising:
a processor;
a bias voltage supply in communication with the processor; and
at least one capacitive micromachined ultrasonic transducer (CMUT) including:
a first bias controllable region including a plurality of first CMUT cells, and
a second bias controllable region including a plurality of second CMUT cells disposed laterally adjacent to the plurality of first CMUT cells;
wherein during use of the CMUT for at least one of sending or receiving ultrasonic energy, the processor is configured to cause the bias voltage supply to supply a first bias voltage to the first bias controllable region and a second bias voltage to the second bias controllable region, wherein the first bias voltage applied to the first bias controllable region has a first waveform and the second bias voltage applied to the second bias controllable region has a second waveform, wherein the first waveform differs from the second waveform by at least one of shape, slope, or maximum value.

19. The system as recited in claim 18, wherein the processor is configured to apply the first bias voltage at a different timing from the second bias voltage.

20. The system as recited in claim 18, wherein the processor is configured to:

apply, at a first point in time, the first bias voltage as an increasing bias voltage that increases over time; and begin applying, at a second point in time, the second bias voltage as an increasing bias voltage that increases over time at a different rate than the first bias voltage, wherein the second point in time is later than the first point in time.

21. The system as recited in claim 18, wherein the processor is further configured to apply the first bias voltage and the second bias voltage as monotonically increasing voltages that increase over time, wherein the second bias voltage increases faster over time than the first bias voltage.

22. The system as recited in claim 18, wherein:

the CMUT further comprises a third bias controllable region adjacent to at least one of the first bias controllable region or the second bias controllable region, the third bias controllable region including a plurality of third CMUT cells; and the processor is further configured to apply a third bias voltage to the third bias controllable region, wherein the third bias voltage is at least one of:

applied at a different voltage than the first bias voltage and the second bias voltage, or applied at a different timing than the first bias voltage and the second bias voltage.

23. The system as recited in claim 18, wherein:

the first bias controllable region and the second bias controllable region are included in a CMUT array including a plurality of CMUT elements;

the first bias controllable region includes the plurality of first CMUT cells and the first sub-electrode in a plurality of first sub-electrodes, each first sub-electrode corresponding respectively to a different electrode of the plurality of electrodes in the CMUT array; and the second bias controllable region includes the plurality of second CMUT cells and the second sub-electrode in a plurality of second sub-electrodes, each corresponding respectively to a different electrode of the plurality of electrodes in the CMUT array.

24. A capacitive micromachined ultrasonic transducer (CMUT) array having a plurality of CMUT elements, individual ones of the CMUT elements including:

a first bias controllable region including a plurality of first CMUT cells;

a second bias controllable region including a plurality of second CMUT cells;

a third bias controllable region including a plurality of third CMUT cells located laterally between the plurality of first CMUT cells and the plurality of second CMUT cells, a first electrode disposed on a first side of the plurality of first CMUT cells, the plurality of second CMUT cells and the plurality of third CMUT cells; and a second electrode disposed on a second side of the plurality of first CMUT cells, the plurality of second CMUT cells and the plurality of third CMUT cells, opposite to the first electrode, the second electrode comprising:

a first sub-electrode associated with the plurality of first CMUT cells, a second sub-electrode associated with the plurality of second CMUT cells, and a third sub-electrode associated with the plurality of third CMUT cells;

a first bias voltage supply configured for supplying a first bias voltage to the first sub-electrode and the second sub-electrode;

a second DC bias voltage supply configured for supplying a second bias voltage to the third sub-electrode, wherein the first bias voltage applied to the first sub-electrode and the second sub-electrode has a first waveform and the second bias voltage applied to the third sub-electrode has a second waveform, wherein the first waveform differs from the second waveform by at least one of shape, slope, or maximum value.

25. The CMUT array as recited in claim 24, wherein the first electrode comprises a fourth sub-electrode associated with the first CMUT cells and a fifth sub-electrode associated with the second and third CMUT cells.

26. The CMUT array as recited in claim 24, further comprising:

a fourth bias controllable region including a plurality of fourth CMUT cells located on a third side of the plurality of first CMUT cells opposite to the plurality of third CMUT cells, and having the first electrode disposed on a first side and the second electrode disposed on a second side, opposite to the first electrode, wherein the second electrode further comprises a fourth sub-electrode associated with the fourth CMUT cells; and a fifth bias controllable region including a plurality of fifth CMUT cells located on a third side of the plurality of second CMUT cells, opposite to the third CMUT cells, and having the first electrode disposed on a first side and the second electrode disposed on a second side, opposite to the first electrode, wherein the second electrode further comprises a fifth sub-electrode associated with the fifth CMUT cells.

27. The CMUT array as recited in claim 24, wherein:

the first bias voltage supply is configured for increasing the first bias voltage at a first rate of change over time; and the second bias voltage supply is configured for increasing the second bias voltage at a second rate of change over time.

28. The CMUT array as recited in claim 24, wherein:

a plurality of the first sub-electrodes are electrically connected to each other across the plurality of elements; and a plurality of the second sub-electrodes are electrically connected to each other across the plurality of elements.

29. The CMUT array as recited in claim 24, wherein the plurality of first CMUT cells and the plurality of second CMUT cells are structurally different from the plurality of third CMUT cells in at least one of length, width, height, shape, or membrane configuration.

* * * * *